United States Patent
Zhang

(10) Patent No.: US 12,058,766 B2
(45) Date of Patent: Aug. 6, 2024

(54) METHOD AND DEVICE USED FOR DRX IN WIRELESS COMMUNICATION

(71) Applicant: Xiaobo Zhang, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 442 days.

(21) Appl. No.: 17/359,651

(22) Filed: Jun. 28, 2021

(65) Prior Publication Data
US 2021/0329732 A1 Oct. 21, 2021

Related U.S. Application Data

(63) Continuation of application No. PCT/CN2021/072410, filed on Jan. 18, 2021.

(30) Foreign Application Priority Data

Jan. 20, 2020 (CN) .......................... 202010067264.4

(51) Int. Cl.
*H04W 76/28* (2018.01)
*H04W 72/0446* (2023.01)
(Continued)

(52) U.S. Cl.
CPC ....... *H04W 76/28* (2018.02); *H04W 72/0446* (2013.01); *H04W 72/12* (2013.01); *H04W 76/38* (2018.02)

(58) Field of Classification Search
CPC ....... H04W 72/20; H04W 72/23; H04W 4/46; H04W 52/0216; H04W 72/02;
(Continued)

(56) References Cited

U.S. PATENT DOCUMENTS

| | | | |
|---|---|---|---|
| 2021/0258921 A1* | 8/2021 | Zhang | H04W 72/40 |
| 2022/0174602 A1* | 6/2022 | Zhang | H04L 1/08 |
| 2022/0346179 A1* | 10/2022 | Yang | H04W 72/30 |

FOREIGN PATENT DOCUMENTS

WO 2018064477 A1 4/2018

OTHER PUBLICATIONS

ISR in application PCT/CN2021/072410 dated Apr. 19, 2021.
(Continued)

*Primary Examiner* — Quoc Thai N Vu

(57) ABSTRACT

The present disclosure provides a method and a device in wireless communications for Discontinuous Reception (DRX). A first node receives first information, the first information used for determining an Active Time in a first time resource pool; and senses a target signaling in a first time resource sub-pool; and transmits a first radio signal in a first time-frequency resource block, the first time-frequency resource block belonging to a first resource pool, the first resource pool being either one of a first candidate resource pool and a second candidate resource pool; the first time resource sub-pool belongs to the Active Time in the first time resource pool. The present disclosure takes into account the influence of DRX over the time-frequency resource selection in sidelink transmissions, thereby improving success rate of transmission.

20 Claims, 6 Drawing Sheets

(51) Int. Cl.
*H04W 72/12* (2023.01)
*H04W 76/38* (2018.01)

(58) Field of Classification Search
CPC ......... H04W 72/0446; H04W 72/0453; H04W 72/12; H04W 72/40; H04W 72/53; H04W 76/28; H04W 92/18; H04W 4/40; H04W 76/38
See application file for complete search history.

(56) References Cited

OTHER PUBLICATIONS

Huawei et al; "Impact on DRX with AUL", 3GPP Draft; R2-1808450 Impact on DRX With AUL,3rd Generation Partnership Project(3GPP),Mobile Competence Centre; 650, Route Des Lucioles; F-06921 Sophia-Antipolis Cedex; France vol. RAN WG2,no. Busan, Korea; May 21, 2018-May 25, 2018May 20, 2018 (May 20, 2018), XP051444723.

Intel Corporation: "Resource Allocation Schemes for NR V2X Communication", 3GPPDRAFT; R1-1902484 INTEL-EV2X SL RA, 3rd Generation Partnership Project (3GFP), Mobile Competence Centre; 650, Route Des Lucioles;F-06921 Sophia-Antipolis Cedex; France vol. RAN WG1,no. Athens, Greece; Feb. 25, 2019-Mar. 1, 2019 Feb. 16, 2019(Feb. 16, 2019), XP051600180.

CAICT: "Considerations on procedures of NR Sidelink",3GPP Draft; R1-1911324,3rd Generation Partnership PROJECT(3GPP),Mobile Competence Centre ; 650,Route Des LUCIOLES;F-06921 Sophia-Antipolis CedexFrancevol. RAN WG1,no. Chongqing, China; Oct. 14, 2019-Oct. 20, 2019 Oct. 7, 2019 (Oct. 7, 2019), XP051809049.

\* cited by examiner

METHOD AND DEVICE USED FOR DRX IN WIRELESS COMMUNICATION

CROSS REFERENCE TO RELATED APPLICATIONS

This application is a continuation of International Application No. PCT/CN2021/072410, filed Jan. 18, 2021, claims the priority benefit of Chinese Patent Application No. 202010067264.4, filed on Jan. 20, 2020, the full disclosure of which is incorporated herein by reference.

BACKGROUND

TECHNICAL FIELD

The present disclosure relates to methods and devices in wireless communication systems, and in particular to a method and a device in sidelink wireless communications that support Discontinuous Reception.

RELATED ART

Discontinuous Reception (DRX) is a method commonly used in cellular communications to reduce power consumption of communication terminals and lengthen standby time. A base station manages a DRX-related timer through Downlink Control Information (DCI) or Medium Access Control (MAC) Control Element (CE), and then, controls whether a terminal performs wireless reception in a given slot or subframe.

As application scenarios for wireless communication systems become increasingly diverse, different performance requirements have been put forward over the systems. To meet these various performance requirements, the 3rd Generation Partner Project (3GPP) Radio Access Network (RAN) #72 Plenary decided to study New Radio (NR), or what is called the Fifth Generation (5G), and later at the 3GPP RAN #75 Plenary, a Work Item (WI) was approved to standardize NR. In response to rapid growth of Vehicle-to-Everything (V2X) traffics, the 3GPP also has started standard planning and research work under the framework of NR. A new WI was initiated at the 3GPP RAN #86 Plenary for standardization of NR V2X DRX.

SUMMARY

Inventors find through researches that in NR V2X mode2 of resources allocation, a UE takes no account of the impact of DRX when acquiring through sensing time-frequency resources available for transmitting, thus leading to the incompleteness of information it sensed. If the information is further used for determining time-frequency resources for transmitting, the transmission will probably be unsuccessful. Therefore, the UE is unlikely to acquire time-frequency resources to be transmitted in an effective way based on the current mechanism of sensing.

To address the above problem, the present disclosure provides a solution. It should be noted that though the present disclosure only took the NR V2X scenario for example in the statement above, it is also applicable to other scenarios confronting the same difficulty, including relay network, Device-to-Device (D2D) network, cellular networks, and scenarios supporting Half Duplex UE, where similar technical effects can be achieved. Additionally, the adoption of a unified solution for various scenarios, including but not limited to NR V2X and downlink communications, contributes to the reduction of hardcore complexity and costs. If no conflict is incurred, embodiments in the first node in the present disclosure and the characteristics of the embodiments are also applicable to any other node, and vice versa. And the embodiments in the present disclosure and the characteristics in the embodiments can be arbitrarily combined if there is no conflict. Particularly, for interpretations of the terminology, nouns, functions and variants (unless otherwise specified) in the present disclosure, refer to definitions given in TS36 series, TS38 series and TS37 series of 3GPP specifications.

The present disclosure provides a method in a first node for wireless communications, comprising:
receiving first information, the first information being used for determining an active time in a first time resource pool; and sensing a target signaling in a first time resource sub-pool; and transmitting a first radio signal in a first time-frequency resource block, the first time-frequency resource block belonging to a first resource pool, the first resource pool being either one of a first candidate resource pool and a second candidate resource pool;

herein, the first time resource sub-pool belongs to the active time in the first time resource pool; and a length of the first time resource sub-pool is used for determining the first resource pool between the first candidate resource pool and the second candidate resource pool.

In one embodiment, the first radio signal is transmitted on Sidelink (SL).

In one embodiment, the first node senses any target signaling received in the first time resource sub-pool.

In one embodiment, the first resource pool used for determining the first time-frequency resource block is either one of the first candidate resource pool and the second candidate resource pool, so as to avoid incompleteness of information sensed in one candidate resource pool and possible failure caused in transmission.

In one embodiment, the first node judges according to the length of the first time resource sub-pool whether to determine the first resource pool from the first candidate resource pool or the second candidate resource pool, thus enhancing the effectiveness of sensed information and of a first time-frequency resource block selected, and finally improving success rate of transmission.

Specifically, according to one aspect of the present disclosure, the above method is characterized in further comprising:
maintaining a first timer;
herein, the active time in the first time resource pool comprises operation time of the first timer.

Specifically, according to one aspect of the present disclosure, the above method is characterized in further comprising:
the active time in the first time resource pool comprising downlink reception time;
herein, the first radio signal is transmitted on sidelink.

Specifically, according to one aspect of the present disclosure, the above method is characterized in further comprising:
performing a measurement in the first time resource sub-pool;
herein, the first resource pool is the first candidate resource pool, and a first parameter set is used for determining the first time-frequency resource block from the first candidate resource pool, the first parameter set belonging to a first candidate parameter set, the first candidate parameter set being determined based on the measurement in the first time resource sub-pool.

In one embodiment, the target signaling is measured in the first time resource sub-pool.

Specifically, according to one aspect of the present disclosure, the above method is characterized in further comprising:

when the length of the first time resource sub-pool is greater than a first threshold, determining the first resource pool from the first candidate resource pool; when the length of the first time resource sub-pool is smaller than a first threshold, determining the first resource pool from the second candidate resource pool.

In one embodiment, when the length of the first time resource sub-pool is equal to a first threshold, the first resource pool is determined from the first candidate resource pool.

In one embodiment, when the length of the first time resource sub-pool is equal to a first threshold, the first resource pool is determined from the second candidate resource pool.

Specifically, according to one aspect of the present disclosure, the above method is characterized in further comprising:

a first bit block being used for generating the first radio signal, and whether the first radio signal is an initial transmission of the first bit block being used for determining the first resource pool between the first candidate resource pool and the second candidate resource pool.

Specifically, according to one aspect of the present disclosure, the above method is characterized in further comprising:

receiving second information and third information;

herein, the second information is used for determining the first candidate resource pool, while the third information is used for determining the second candidate resource pool.

The present disclosure provides a method in a second node for wireless communications, comprising:

transmitting first information, the first information being used for indicating an active time in a first time resource pool; a target signaling being sensed in a first time resource sub-pool;

a first time-frequency resource block being used for transmitting a first radio signal, and the first time-frequency resource block belonging to a first resource pool, the first resource pool being either one of a first candidate resource pool and a second candidate resource pool;

herein, the first time resource sub-pool belongs to the active time in the first time resource pool; and a length of the first time resource sub-pool is used for determining the first resource pool between the first candidate resource pool and the second candidate resource pool.

Specifically, according to one aspect of the present disclosure, the above method is characterized in further comprising:

a first timer being maintained;

herein, the active time in the first time resource pool comprises operation time of the first timer.

Specifically, according to one aspect of the present disclosure, the above method is characterized in further comprising:

the active time in the first time resource pool comprising downlink reception time;

herein, the first radio signal is transmitted on sidelink.

Specifically, according to one aspect of the present disclosure, the above method is characterized in further comprising:

the target signaling being measured in the first time resource sub-pool;

herein, the first resource pool is the first candidate resource pool, and a first parameter set is used for determining the first time-frequency resource block from the first candidate resource pool, the first parameter set belonging to a first candidate parameter set, the first candidate parameter set being determined based on the measurement in the first time resource sub-pool.

Specifically, according to one aspect of the present disclosure, the above method is characterized in further comprising:

when the length of the first time resource sub-pool is greater than a first threshold, determining the first resource pool from the first candidate resource pool; when the length of the first time resource sub-pool is smaller than a first threshold, determining the first resource pool from the second candidate resource pool.

Specifically, according to one aspect of the present disclosure, the above method is characterized in further comprising:

a first bit block being used for generating the first radio signal, and whether the first radio signal is an initial transmission of the first bit block being used for determining the first resource pool between the first candidate resource pool and the second candidate resource pool.

Specifically, according to one aspect of the present disclosure, the above method is characterized in further comprising:

transmitting second information and third information;

herein, the second information is used for determining the first candidate resource pool, while the third information is used for determining the second candidate resource pool.

The present disclosure provides a first node for wireless communications, comprising:

a first receiver, which receives first information, the first information being used for determining an active time in a first time resource pool; and which senses a target signaling in a first time resource sub-pool; and a first transmitter, which transmits a first radio signal in a first time-frequency resource block, the first time-frequency resource block belonging to a first resource pool, the first resource pool being either one of a first candidate resource pool and a second candidate resource pool;

herein, the first time resource sub-pool belongs to the active time in the first time resource pool; and a length of the first time resource sub-pool is used for determining the first resource pool between the first candidate resource pool and the second candidate resource pool.

The present disclosure provides a second node for wireless communications, comprising:

a second transmitter, which transmits first information, the first information being used for indicating an active time in a first time resource pool; a target signaling being sensed in a first time resource sub-pool;

a first time-frequency resource block being used for transmitting a first radio signal, and the first time-frequency resource block belonging to a first resource pool, the first resource pool being either one of a first candidate resource pool and a second candidate resource pool;

herein, the first time resource sub-pool belongs to the active time in the first time resource pool; and a length of the first time resource sub-pool is used for determining the first resource pool between the first candidate resource pool and the second candidate resource pool.

In one embodiment, the method proposed in the present disclosure is advantageous in the following aspects:

By adopting the method in the present disclosure, the influence of DRX on the sensing of time-frequency resource block in NR SL mode2 of resources allocation will be taken into account, so that more appropriate time-frequency resource blocks will be applied to sidelink transmitting, thus enhancing transmission success rate.

According to the method in the present disclosure, introducing two candidate resource pools and then deciding whether to select a first resource pool from a first candidate resource pool or a second candidate resource pool according to the length of a first time resource sub-pool is an effective practice in avoidance of transmission failure resulting from signaling information incompleteness due to inadequacy of measurement time when provided only one candidate resource pool.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
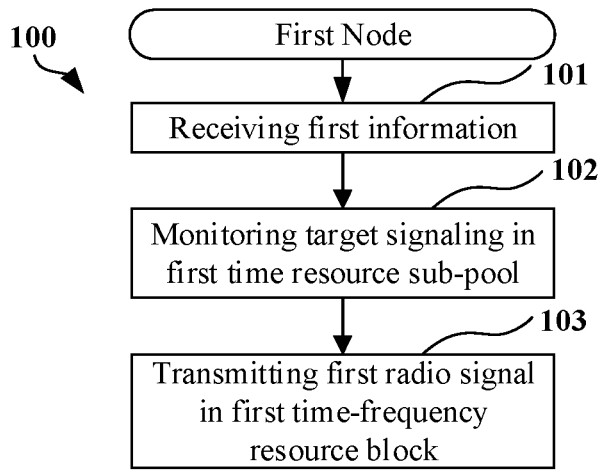
FIG. 1 illustrates a flowchart of first information, a target signaling and a first radio signal according to one embodiment of the present disclosure.

Embodiment 1 illustrates a flowchart of first information, a target signaling and a first radio signal according to one embodiment of the present disclosure, as shown in FIG. 1. In FIG. 1, each box represents a step, and it is particularly underlined that the order in which the boxes are arranged does not imply a chronological sequence of each step respectively marked.

In Embodiment 1, the first node in the present disclosure receives first information in step 101, the first information being used for determining an active time in a first time resource pool; and senses a target signaling in a first time resource sub-pool in step 102, the first time resource sub-pool belonging to the active time in the first time resource pool; and transmits a first radio signal in a first time-frequency resource block in step 103, the first time-frequency resource block belonging to a first resource pool, the first resource pool being either one of a first candidate resource pool and a second candidate resource pool; and a length of the first time resource sub-pool is used for determining the first resource pool between the first candidate resource pool and the second candidate resource pool.

In one embodiment, the first information is higher layer information.

In one embodiment, the first information is transmitted via a higher layer signaling.

In one embodiment, the first information is transmitted via a physical layer signaling.

In one embodiment, the first information comprises all or part of a higher layer signaling.

In one embodiment, the first information comprises all or part of a physical layer signaling.

In one embodiment, the first information is transmitted via an air interface.

In one embodiment, the first information is transmitted via a wireless interface.

In one embodiment, the first information is transmitted from the second node in the present disclosure to the first node in the present disclosure.

In one embodiment, the first information is transmitted through Downlink (DL).

In one embodiment, the first information is transmitted through SL.

In one embodiment, the first information is transmitted via a Uu interface.

In one embodiment, the first information is transmitted via a PC5 interface.

In one embodiment, the first information is transmitted internally within the first node in the present disclosure.

In one embodiment, the first information is conveyed from a higher layer of the first node in the present disclosure to a physical layer of the first node in the present disclosure.

In one embodiment, the first information is configured.

In one embodiment, the first information is pre-configured.

In one embodiment, the first information comprises all or part of Information Elements (IEs) in a Radio Resource Control (RRC) signaling.

In one embodiment, the first information comprises all or part of fields of an IE in an RRC signaling.

In one embodiment, the first information is transmitted through a Downlink Shared Channel (DL-SCH).

In one embodiment, the first information is transmitted through a Physical Downlink Shared Channel (PDSCH).

In one embodiment, the first information is transmitted through a Physical Downlink Control Channel (PDCCH).

In one embodiment, the first information comprises all or part of fields in a DCI signaling.

In one embodiment, the first information is transmitted through a Sidelink Shared Channel (SL-SCH).

In one embodiment, the first information is transmitted through a Physical Sidelink Shared Channel (PSSCH).

In one embodiment, the first information is transmitted through a Physical Sidelink Control Channel (PSCCH).

In one embodiment, the first information comprises all or part of fields in a Sidelink Control Information (SCI) signaling.

In one embodiment, the first information is Broadcast.

In one embodiment, the first information is Unicast.

In one embodiment, the first information is Cell Specific.

In one embodiment, the first information is UE-specific.

In one embodiment, the first information is UE group-specific.

In one embodiment, the first information is carried by the target signaling in the present disclosure.

In one embodiment, the first information is carried by a signaling other than the target signaling in the present disclosure.

In one embodiment, the first information comprises a field in the target signaling in the present disclosure.

In one embodiment, the first information comprises an initial value of the first timer.

In one embodiment, the target signaling is SCI.

In one embodiment, the target signaling carries priority information.

In one embodiment, the target signaling is DCI.

In one embodiment, the target signaling is a PDCCH.

In one embodiment, the target signaling is a PSCCH.

In one embodiment, the target signaling is a PDSCH.

In one embodiment, the target signaling is a PSSCH.

In one embodiment, the target signaling is piggybacked by a PSSCH.

In one embodiment, the target signaling is transmitted via an air interface.

In one embodiment, the target signaling is transmitted via a wireless interface.

In one embodiment, the target signaling is transmitted via a PC5 interface.

In one embodiment, the target signaling is transmitted via a Uu interface.

In one embodiment, the target signaling is transmitted through SL.

In one embodiment, the target signaling is transmitted through DL.

In one embodiment, the target signaling is a MAC layer signaling.

In one embodiment, the target signaling is a physical layer signaling.

In one embodiment, the target signaling is a dynamic signaling.

In one embodiment, the target signaling is UE-Specific.

In one embodiment, the target signaling is UE Group-Specific.

In one embodiment, the target signaling is transmitted by Unicast.

In one embodiment, the target signaling is transmitted by Groupcast.

In one embodiment, the target signaling is transmitted by Broadcast.

In one embodiment, the target signaling occupies frequency-domain resources in the first candidate resource pool.

In one embodiment, the target signaling does not occupy frequency-domain resources in the second candidate resource pool.

In one embodiment, the first time resource pool comprises a fixed positive integer number of slots.

In one embodiment, the first time resource pool comprises 1000 slots.

In one embodiment, the first time resource pool comprises a fixed positive integer number of sidelink slots.

In one embodiment, the first time resource pool comprises 1000 sidelink slots.

In one embodiment, the first time resource pool comprises a configurable number of slots.

In one embodiment, the first time resource pool comprises a configurable number of sidelink slots.

In one embodiment, the first time resource sub-pool is wholly overlapping with the active time in the first time resource pool.

In one embodiment, there is at least one slot belonging to the active time in the first time resource pool and not belonging to the first time resource sub-pool.

In one embodiment, the first time resource sub-pool is each slot over which wireless reception is performed.

In one embodiment, the first time resource sub-pool is each slot over which sidelink wireless reception is performed.

In one embodiment, the first time resource sub-pool is each slot over which no wireless transmission is performed.

In one embodiment, the first time resource sub-pool is each slot over which no sidelink wireless transmission is performed.

In one embodiment, the target signaling is sensed in each slot in the first time resource sub-pool.

In one embodiment, the target signaling is sensed in some slots in the first time resource sub-pool.

In one embodiment, the target signaling is sensed in each slot in the first time resource sub-pool, over which no wireless transmission is performed.

In one embodiment, the target signaling is sensed in each slot in the first time resource sub-pool, over which no sidelink wireless transmission is performed.

In one embodiment, the target signaling is sensed in each slot in the first time resource sub-pool, over which wireless reception is performed.

In one embodiment, the target signaling is sensed in each slot in the first time resource sub-pool, over which sidelink wireless reception is performed.

In one embodiment, the first receiver performs measurement in the first time resource sub-pool.

In one embodiment, only when the first resource pool is the first candidate resource pool does the first receiver perform measurement in the first time resource sub-pool.

In one embodiment, the measurement performed in the first time resource sub-pool is in the first candidate resource pool rather than in the second candidate resource pool.

In one embodiment, the phrase of sensing a target signaling in the first time resource sub-pool includes that Blind Decoding over the target signaling is performed in the first time resource sub-pool.

In one embodiment, the phrase of sensing a target signaling in the first time resource sub-pool includes that Blind Decoding is performed on each of multiple Resource Element (RE) sets in the first time resource sub-pool respectively, if the decoding is correct, the target signaling is successfully received; if the decoding is incorrect, the target signaling is not received.

In one embodiment, the phrase of sensing a target signaling in the first time resource sub-pool includes that energy detection on the target signaling is performed in the first time resource sub-pool.

In another subembodiment of the above embodiment, the phrase of sensing a target signaling in the first time resource sub-pool includes that Blind Decoding is performed on the target signaling in the first time resource sub-pool, when decoded successfully, the target signaling will gain a priority carried by SCI, the priority indicating priority information of the target radio signal.

In one embodiment, the phrase of sensing a target signaling in the first time resource sub-pool includes that Blind Decoding is performed on the target signaling and energy detection is performed on a target radio signal in the first time resource sub-pool; the target signaling is used for indicating time-frequency resources occupied by the target radio signal and a Modulation and Coding Scheme (MCS) employed by the target radio signal.

In one embodiment, the phrase of sensing a target signaling in the first time resource sub-pool includes that Blind Decoding is performed on the target signaling and energy detection is performed on a reference signal of a target radio signal in the first time resource sub-pool; the target signaling is used for indicating time-frequency resources occupied by the target radio signal and a Modulation and Coding Scheme (MCS) employed by the target radio signal.

In one embodiment, the phrase of sensing a target signaling in the first time resource sub-pool includes that Blind Decoding is performed on the target signaling and energy detection is performed on a reference signal of a target radio signal in the first time resource sub-pool; when decoded successfully, the target signaling will gain a priority carried by SCI, the priority indicating priority information of the target radio signal; the target signaling is used for indicating time-frequency resources occupied by the target radio signal and a Modulation and Coding Scheme (MCS) employed by the target radio signal.

In one embodiment, the phrase of sensing a target signaling in the first time resource sub-pool includes that Blind Decoding is performed on the target signaling and energy detection on a reference signal of a target radio signal and decoding on the target radio signal are performed in the first time resource sub-pool; the target signaling is used for indicating time-frequency resources occupied by the target radio signal and a Modulation and Coding Scheme (MCS) employed by the target radio signal.

In one subembodiment of the above three embodiments, the phrase that energy detection is performed on a reference signal of a target radio signal includes determining a Channel Busy Ratio (CBR) parameter set through energy detection.

In one subembodiment of the above three embodiments, the phrase that energy detection is performed on a reference signal of a target radio signal includes determining a Physical Sidelink Shared Channel-Reference Signal Received Power (PSSCH-RSRP) parameter set through energy detection.

In another subembodiment of the above three embodiments, the phrase that energy detection is performed on a reference signal of a target radio signal includes determining a Sidelink-Received Signal Strength Indication (S-RSSI) parameter set through energy detection.

In another subembodiment of the above three embodiments, the phrase that energy detection is performed on a reference signal of a target radio signal includes determining a Sidelink-Reference Signal Receiving Quality (S-RSRQ) parameter set through energy detection.

In one embodiment, the phrase of sensing a target signaling in the first time resource sub-pool includes performing Cyclic Redundancy Check (CRC) over the target signaling in the first time resource sub-pool.

In one embodiment, a transmitter of the target signaling is a transmitter other than the first node.

In one embodiment, the downlink signaling is Broadcast.

In one embodiment, the downlink signaling is a higher layer signaling.

In one embodiment, the first time-frequency resource block, a first candidate resource pool and the second candidate resource pool respectively comprise a positive integer number of subchannel(s) in frequency domain.

In one embodiment, the first time-frequency resource block, a first candidate resource pool and the second candidate resource pool respectively comprise a positive integer number of Physical Resource block(s) (PRB(s)) in frequency domain.

In one embodiment, the first time-frequency resource block, a first candidate resource pool and the second candidate resource pool respectively comprise multiple REs in frequency domain.

In one embodiment, the first time-frequency resource block, a first candidate resource pool and the second candidate resource pool respectively comprise consecutive frequency-domain resources in frequency domain.

In one embodiment, the first time-frequency resource block, a first candidate resource pool and the second candidate resource pool respectively comprise discrete frequency-domain resources in frequency domain.

In one embodiment, the first time-frequency resource block, a first candidate resource pool and the second candidate resource pool respectively belong to a carrier in frequency domain.

In one embodiment, the first time-frequency resource block, a first candidate resource pool and the second candidate resource pool respectively belong to a sidelink Bandwidth part (BWP) in frequency domain.

In one embodiment, the first time-frequency resource block, a first candidate resource pool and the second candidate resource pool respectively belong to a sidelink Resource Pool.

In one embodiment, the first time-frequency resource block, a first candidate resource pool and the second candidate resource pool can also respectively belong to an uplink BWP.

In one embodiment, the first time-frequency resource block belongs to the first resource pool in frequency domain.

In one embodiment, the first time-frequency resource block comprises a positive integer number of multicarrier symbol(s) in time domain.

In one embodiment, the first time-frequency resource block comprises a positive integer number of time-domain consecutive slots in time domain.

In one embodiment, the first time-frequency resource block comprises more than one time-domain discrete Orthogonal Frequency Division Multiplexing (OFDM) symbols in time domain.

In one embodiment, the first time-frequency resource block comprises more than one time-domain discrete slots in time domain.

In one embodiment, the multicarrier symbol is an OFDM symbol.

In one embodiment, the multicarrier symbol is a Single-carrier Frequency-Division Multiple Access (SC-FDMA) symbol.

In one embodiment, the multicarrier symbol is a Filter-bank Multicarrier (FBMC) symbol.

In one embodiment, the first time-frequency resource block is reserved for SCI.

In one embodiment, the first time-frequency resource block is reserved for PSSCH transmission.

In one embodiment, the first time-frequency resource block is reserved for Sidelink data transmission.

In one embodiment, the first time-frequency resource block is reserved for sidelink Channel Status Information (CSI) transmission.

In one embodiment, the first time-frequency resource block is reserved for Physical Sidelink Feedback Channel (PSFCH) transmission.

In one embodiment, the first time-frequency resource block is reserved for part or all of Sidelink Feedback Control Information (SFCI).

In one embodiment, the first time-frequency resource block is reserved for sidelink PSSCH-RSRP report.

In one embodiment, the first time-frequency resource block is reserved for sidelink S-RSRQ report.

In one embodiment, the first time-frequency resource block is reserved for S-RSSI report.

In one embodiment, the first radio signal is transmitted via an air interface.

In one embodiment, the first radio signal is transmitted via a wireless interface.

In one embodiment, the first radio signal is transmitted via a PC5 interface.

In one embodiment, the first radio signal is transmitted via SL.

In one embodiment, all or part of a Transport Block (TB) is used for generating the first radio signal.

In one embodiment, all or part of a TB is used together with a reference signal for generating the first radio signal.

In one embodiment, the first radio signal is obtained by all or part of bits comprised in a TB sequentially through CRC Calculation, Channel Coding, Rate matching, Scrambling, Modulation, Layer Mapping, Antenna Port Mapping, Mapping to Virtual Resource Blocks, Mapping from Virtual to Physical Resource Blocks, OFDM Baseband Signal Generation, and Modulation and Up conversion.

In one embodiment, the first radio signal is obtained by all or part of bits comprised in payload of a piece of SCI sequentially through CRC Calculation, Channel Coding, Rate Matching, Scrambling, Modulation, Mapping to Physical Resources, OFDM Baseband Signal Generation, and Modulation and Up conversion.

In one embodiment, a target receiver of the first radio signal is a UE.

In one embodiment, a target receiver of the first radio signal is a Roadside Unit (RSU).

In one embodiment, a target receiver of the first radio signal is an On-board Unit.

In one embodiment, a target receiver of the first radio signal is a hand-held terminal.

In one embodiment, a target receiver of the first radio signal is a Laptop.

In one embodiment, a target receiver of the first radio signal is a node device other than the first node in the present disclosure.

In one embodiment, there is at least one RE belonging to the first candidate resource pool and the second candidate resource pool simultaneously.

In one embodiment, there isn't any RE belonging to the first candidate resource pool and the second candidate resource pool simultaneously.

In one embodiment, the first candidate resource pool and the second candidate resource pool are orthogonal in frequency domain.

In one embodiment, the first candidate resource pool and the second candidate resource pool can be partially overlapping in frequency domain.

In one embodiment, the second candidate resource pool is reserved for a UE in which physical layer problems or Radio Link Failure (RLF) is detected.

In one embodiment, the second candidate resource pool is reserved for a UE in which connection re-establishment is initiated.

In one embodiment, the second candidate resource pool is reserved for a UE in which connection establishment is initiated but RRCConnectionReconfiguration is not yet received.

In one embodiment, the second candidate resource pool is reserved for a UE that performs cell handover.

In one embodiment, the second candidate resource pool is reserved for a UE with no sensing result yielded.

In one embodiment, the second candidate resource pool is reserved for a UE configured with DRX.

Embodiment 2

Figure 2:
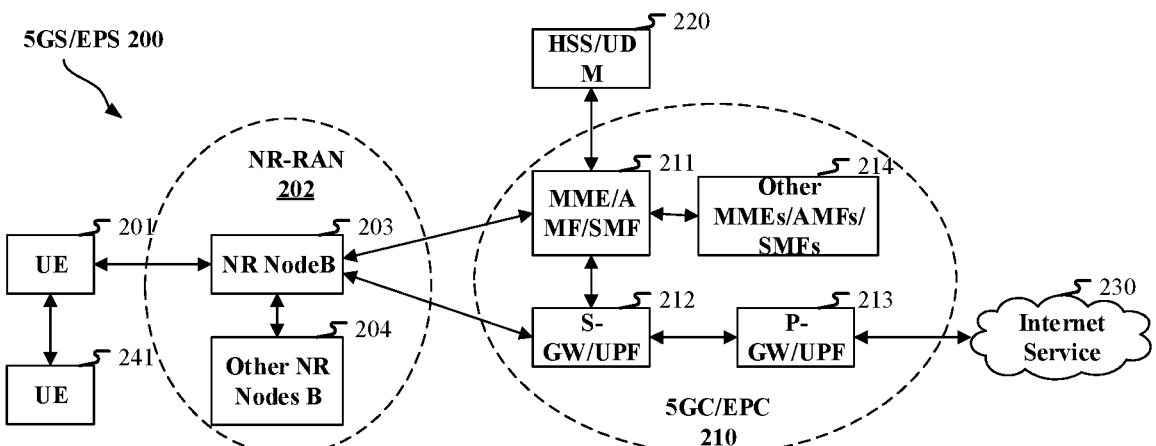
FIG. 2 illustrates a schematic diagram of a network architecture according to one embodiment of the present disclosure.

Embodiment 2 illustrates a schematic diagram of a network architecture according to the present disclosure, as shown in FIG. 2. FIG. 2 is a diagram illustrating a network architecture 200 of NR 5G, Long-Term Evolution (LTE), and Long-Term Evolution Advanced (LTE-A) systems. The NR 5G or LTE network architecture 200 may be called a 5G System/Evolved Packet System (5GS/EPS) 200 or other appropriate terms, which may comprise one or more UEs 201, a UE 241 in communication with UE(s) 201, an NG-RAN 202, a 5G Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will readily understand that various concepts presented throughout the present disclosure can be extended to networks providing circuit switching services. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, satellite mobile communications, Global Positioning Systems (GPS), multimedia devices, video devices, digital audio players (for example, MP3 players), cameras, games consoles, unmanned aerial vehicles, air vehicles, narrowband physical network equipment, machine-type communication equipment, land vehicles, automobiles, vehicle-mounted equipment, vehicle-mounted communications units, wearables, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/ Authentication Management Field (AMF)/ Session Management Function (SMF) 211, other MMES/AMFs/SMFs 214, a Service Gateway (S-GW)/User Plane Function (UPF) 212 and a Packet Date Network Gateway (P-GW) 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212. The S-GW/UPF 212 is connected to the P-GW/UPF 213. The P-GW 213 provides UE IP address allocation and other functions. The P-GW/UPF 213 is connected to the Internet Service 230. The Internet Service 230 comprises operator-compatible IP services, specifically including Internet, Intranet, IP Multimedia Subsystem (IMS) and Packet Switching (PS) Streaming services.

In one embodiment, the UE 201 corresponds to the first node in the present disclosure.

In one embodiment, the UE 201 supports transmission in SL.

In one embodiment, the UE 201 supports a PC5 interface.

In one embodiment, the UE 201 supports Vehicle-to-Everything.

In one embodiment, the UE 201 supports V2X traffics.

In one embodiment, the UE 201 corresponds to the second node in the present disclosure.

In one embodiment, the gNB203 corresponds to the second node in the present disclosure.

In one embodiment, the gNB203 supports Vehicle-to-Everything.

In one embodiment, the gNB203 supports V2X traffics.

In one embodiment, the gNB203 is a Marco Cell base station.

In one embodiment, the gNB203 is a Micro Cell base station.

In one embodiment, the gNB203 is a Pico Cell base station.

In one embodiment, the gNB203 is a Femtocell.

In one embodiment, the gNB203 is a base station supporting large delay difference.

In one embodiment, the gNB203 is a flight platform.

In one embodiment, the gNB203 is satellite equipment.

In one embodiment, a wireless link from the UE 201 to the gNB203 is an uplink.

In one embodiment, a wireless link from the gNB203 to the UE 201 is a downlink.

In one embodiment, a wireless link between the UE 201 and the UE 241 corresponds to the SL in the present disclosure.

In one embodiment, the UE 201 supports DRX transmissions.

In one embodiment, the UE 241 supports DRX transmissions.

Embodiment 3

Figure 3:
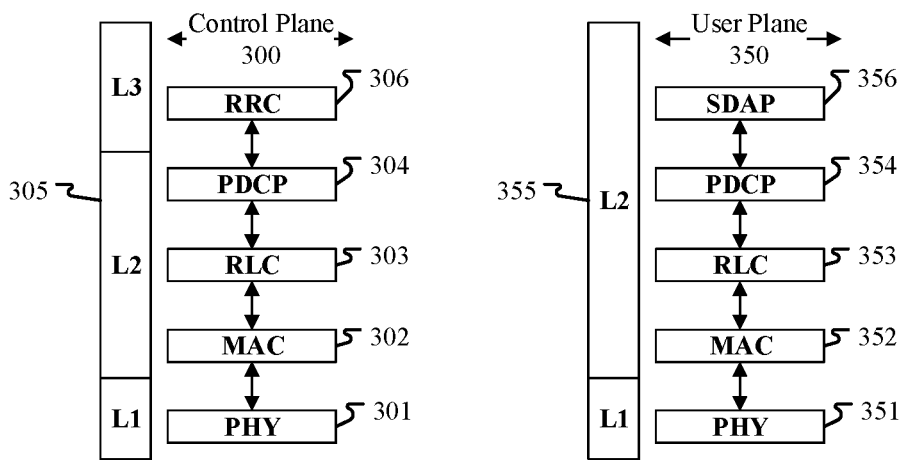
FIG. 3 illustrates a schematic diagram of a radio protocol architecture of a user plane and a control plane according to one embodiment of the present disclosure.

Embodiment 3 illustrates a schematic diagram of an embodiment of a radio protocol architecture of a user plane and a control plane according to the present disclosure, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first node (UE, or RSU in V2X, or vehicle-mounted equipment or vehicle-mounted communication module) and a second node (gNB, UE, or RSU in V2X, or vehicle-mounted equipment or vehicle-mounted communication module), or between two UEs is represented by three layers, which are a layer 1, a layer 2 and a layer 3, respectively. The layer 1 (L1) is the lowest layer which performs signal processing functions of various PHY layers. The L1 is called PHY 301 in the present disclosure. The layer 2 (L2) 305 is above the PHY 301, and is in charge of the link between the first node and the second node, and between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second nodes. The PDCP sublayer 304 provides packet encryption and integrity protection, and provides support for handover of a second node between first nodes. The RLC sublayer 303 provides packet segmentation and reassembling, retransmission of a lost packet through ARQ, and also detection of repeated packets and protocol error detection. The MAC sublayer 302 provides mapping between a logical channel and a transport channel as well as multiplexing of logical channel. The MAC sublayer 302 is also responsible for allocating between first nodes various radio resources (i.e., resource block) in a cell. The MAC sublayer 302 is also in charge of Hybrid Automatic Repeat Request (HARD) operation. In the control plane 300. The RRC sublayer 306 in the L3 layer is responsible for acquiring radio resources (i.e., radio bearer) and configuring the lower layer using an RRC signaling between the second node and the first node. The radio protocol architecture in the user plane 350 comprises the L1 layer and the L2 layer. In the user plane 350, the radio protocol architecture used for the first node and the second node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversity of traffics. Although not described in FIG. 3, the first node may comprise several higher layers above the L2 305, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first information in the present disclosure is generated by the RRC 306.

In one embodiment, the first information in the present disclosure is generated by the MAC 302 or the MAC 352.

In one embodiment, the first information in the present disclosure is generated by the PHY301 or the PHY 351.

In one embodiment, the target signaling in the present disclosure is generated by the MAC 302 or the MAC 352.

In one embodiment, the target signaling in the present disclosure is generated by the PHY301 or the PHY 351.

In one embodiment, the first radio signal in the present disclosure is generated by the RRC 306.

In one embodiment, the first radio signal in the present disclosure is generated by the MAC 302 or the MAC 352.

In one embodiment, the first radio signal in the present disclosure is generated by the PHY301 or the PHY 351.

In one embodiment, the L2 305 or 355 belongs to a higher layer.

In one embodiment, the RRC sublayer 306 in the L3 belongs to a higher layer.

Embodiment 4

Figure 4:
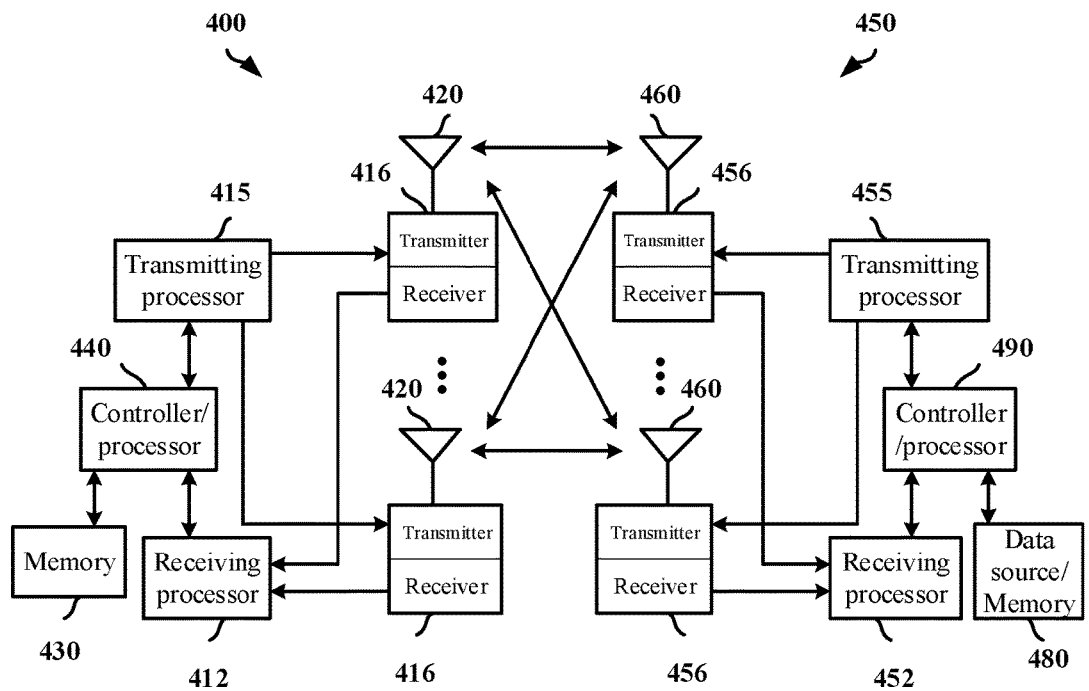
FIG. 4 illustrates a schematic diagram of a first node and a second node according to one embodiment of the present disclosure.

Embodiment 4 illustrates a schematic diagram of a first node and a second node according to the present disclosure, as shown in FIG. 4.

The first node (450) can comprise a controller/processor 490, a receiving processor 452, a transmitting processor 455, a transmitter/receiver 456 comprising an antenna 460, and a data source/memory 480.

The second node (400) can comprise a controller/processor 440, a receiving processor 412, a transmitting processor 415, a transmitter/receiver 416 comprising antenna 420, and a memory 430.

In a transmission from the second node 400 to the first node 450, a higher-layer packet, for example, higher-layer information contained in first information of the present disclosure, is provided to the controller/processor 440. The controller/processor 440 implements the functionality of the L2 and above layers. In the transmission between the second node 400 and the first node 450, the controller/processor 440 provides header compression, encryption, packet segmentation and reordering, and multiplexing between a logical channel and a transport channel, as well as radio resources allocation for the first node 450 based on various priorities. The controller/processor 440 is also responsible for HARQ operation, retransmission of a lost packet and a signaling to the first node 450. The transmitting processor 415 provides various signal processing functions for the L1 (that is, PHY), including coding, interleaving, scrambling, modulation and power control/allocation, precoding and generation of physical layer control signaling. The generation of a physical-layer signaling of first information in the present disclosure is completed in the transmitting processor 415, and generated modulation symbols are divided into parallel streams of which each stream is mapped onto a corresponding multi-carrier subcarrier and/or multicarrier symbol, and then mapped by the transmitting processor 415 to the antenna 420 via the transmitter 416 to be transmitted in the form of radio frequency signal. At the receiving end, each receiver 456 receives a radio frequency signal via a corresponding antenna 460, and recovers baseband information modulated onto a radio frequency carrier and then provides the baseband information to the receiving processor 452. The receiving processor 452 provides various signal receiving functions of the L1, including the receiving of physical layer signal of first information in the present disclosure. Multi-carrier symbols in multicarrier symbol streams are demodulated based on all kinds of modulation schemes (e.g., Binary Phase Shift Keying (BPSK), Quadrature Phase Shift Keying (QPSK)), and are then de-scrambled, decoded and de-interleaved so as to recover data or control signals transmitted by the second node 400 on a physical channel. The data and the control signals are later provided to the controller/processor 490. The controller/processor 490 is in charge of the L2 and above layers and interpretation of the first information in the present disclosure. The controller/processor can be associated with the memory 480 that stores program codes and data. the data source/memory 480 can be called a computer readable medium.

In a transmission from the first node 450 to the second node 400, the data source/memory 480 is configured to provide higher-layer data to the controller/processor 490. The data source/memory 480 represents the L2 and all protocol layers above. The controller/processor 490 provides header compression, encryption, packet segmentation and reordering as well as multiplexing between a logical channel and a transport channel based on radio resources allocation for the second node 400, so as to implement the L2 protocols used for the user plane and the control plane. The controller/processor 490 is also responsible for HARQ operation, retransmission of a lost packet, and a signaling to the second node 400. The transmitting processor 455 provides various signal transmitting processing functions for the L1 (that is, PHY), including coding and interleaving to ensure Forward Error Correction (FEC) at the UE 450 and baseband signal modulation based on each modulation scheme (e.g., BPSK, QPSK). Modulation symbols are divided into parallel streams and each stream is mapped onto a corresponding multicarrier subcarrier and/or multicarrier symbol, and then mapped from the transmitting processor 455 to the antenna 460 via the transmitter 456 to be transmitted in the form of radio frequency signal. The receiver 416 receives a radio frequency signal via a corresponding antenna 420, and recovers baseband information modulated onto a radio frequency carrier and then provides the baseband information to the receiving processor 412. The receiving processor 412 provides various signal receiving processing functions for the L1 (that is, PHY), including acquiring multicarrier symbol streams, and demodulating multicarrier symbols in the multicarrier symbol streams based on different modulation schemes (e.g., BPSK, QPSK), and decoding and de-interleaving the symbols to recover data and/or control signals originally transmitted by the first node 450 on a physical channel. after that the data and/or control signals are provided to the controller/processor 440. And the controller/processor 440 implements the functionality of the L2. The controller/processor 440 can be associated with the memory 430 that stores program codes and data. The memory 430 can be called a computer readable medium.

In one embodiment, the first node 450 comprises at least one processor and at least one memory, the at least one memory comprises computer program codes; the at least one memory and the computer program codes are configured to be used in collaboration with the at least one processor, the first node 450 at least receives first information in step 101, the first information being used for determining an active time in a first time resource pool; and senses a target signaling in a first time resource sub-pool in step 102; and transmits a first radio signal in a first time-frequency resource block in step 103; herein, the first time-frequency resource block belongs to a first resource pool, the first resource pool being either one of a first candidate resource pool and a second candidate resource pool; the first time resource sub-pool belongs to the active time in the first time resource pool; length of the first time resource sub-pool is used for determining the first resource pool between the first candidate resource pool and the second candidate resource pool.

In one embodiment, the first node 450 comprises a memory that stores computer readable instruction program, the computer readable instruction program generates actions when executed by at least one processor, which include: receiving first information in step 101, the first information being used for determining an active time in a first time resource pool; and sensing a target signaling in a first time resource sub-pool in step 102; and transmitting a first radio signal in a first time-frequency resource block in step 103; herein, the first time-frequency resource block belongs to a first resource pool, the first resource pool being either one of a first candidate resource pool and a second candidate resource pool; the first time resource sub-pool belongs to the active time in the first time resource pool; length of the first time resource sub-pool is used for determining the first resource pool between the first candidate resource pool and the second candidate resource pool.

In one embodiment, the second node 400 comprises at least one processor and at least one memory, the at least one memory comprises computer program codes; the at least one memory and the computer program codes are configured to be used in collaboration with the at least one processor. The second node 400 at least transmits first information, the first information being used for indicating an active time in a first time resource pool; a target signaling is sensed in a first time resource sub-pool; a first time-frequency resource block is used for transmitting a first radio signal; the first time-frequency resource block belongs to a first resource pool, the first resource pool being either one of a first candidate resource pool and a second candidate resource pool; the first time resource sub-pool belongs to the active time in the first time resource pool; length of the first time resource sub-pool is used for determining the first resource pool between the first candidate resource pool and the second candidate resource pool.

In one embodiment, the first communication device 410 comprises a memory that stores computer readable instruction program, the computer readable instruction program generates an action when executed by at least one processor, which includes: transmitting first information, the first information being used for indicating an active time in a first time resource pool; a target signaling is sensed in a first time resource sub-pool; a first time-frequency resource block is used for transmitting a first radio signal; the first time-frequency resource block belongs to a first resource pool, the first resource pool being either one of a first candidate resource pool and a second candidate resource pool; the first time resource sub-pool belongs to the active time in the first time resource pool; length of the first time resource sub-pool is used for determining the first resource pool between the first candidate resource pool and the second candidate resource pool.

In one embodiment, the first node 450 is a UE.

In one embodiment, the first node 450 is a V2X-supporting UE.

In one embodiment, the first node 450 is vehicle-mounted equipment.

In one embodiment, the first node 450 is an RSU.

In one embodiment, the second node 400 is a base station i.e., a gNB/eNB.

In one embodiment, the second node 400 is a V2X-supporting base station.

In one embodiment, the second node 400 is a UE.

In one embodiment, the second node 400 is a V2X-supporting UE.

In one embodiment, the second node 400 is vehicle-mounted equipment.

In one embodiment, the second node 400 is an RSU.

In one embodiment, the receiver 456 (comprising the antenna 460), the receiving processor 452 and the controller/processor 490 are used for receiving the first information, the second information and the third information in the present disclosure.

In one embodiment, the transmitter 416 (comprising the antenna 420), the transmitting processor 415 and the controller/processor 440 are used for transmitting the first information, the second information and the third information in the present disclosure.

Embodiment 5

Figure 5:
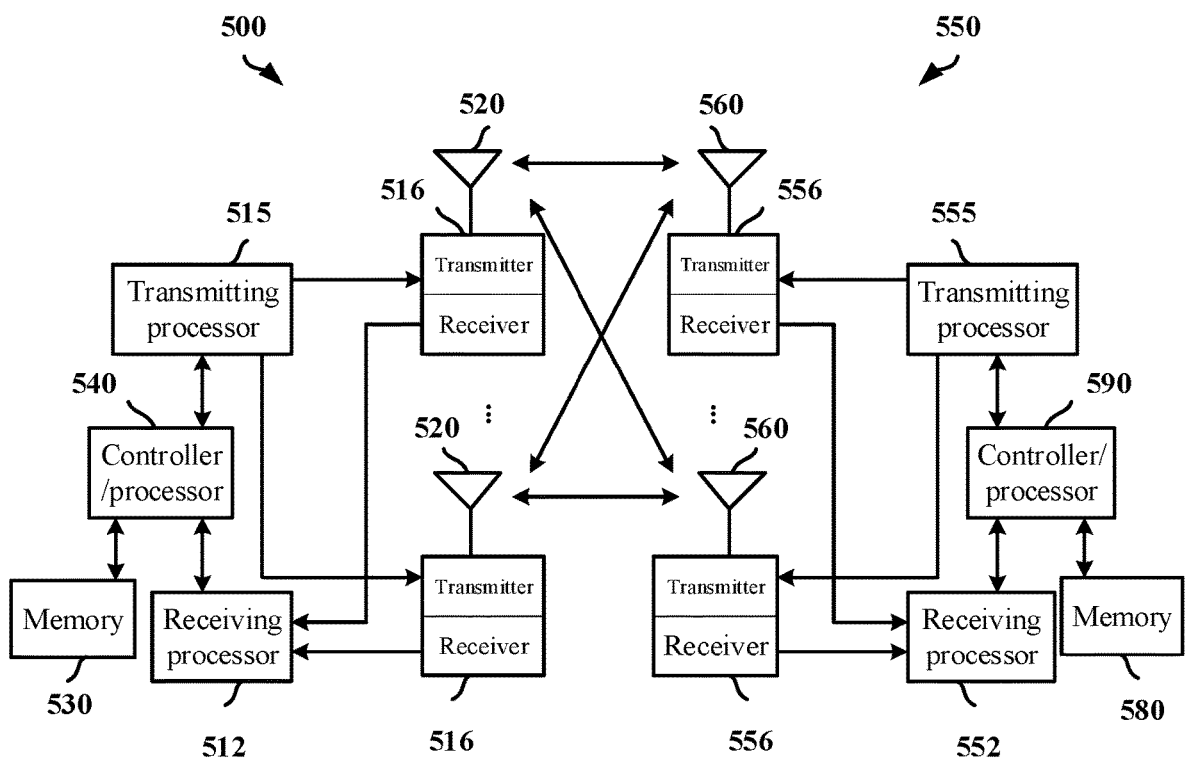
FIG. 5 illustrates a schematic diagram of a first node and another UE according to one embodiment of the present disclosure.

Embodiment 5 illustrates a schematic diagram of a first node and another UE according to the present disclosure, as shown in FIG. 5.

The first node (550) comprises a controller/processor 590, a memory 580, a receiving processor 552, a transmitter/receiver 556 comprising an antenna 560, and a transmitting processor 555. The composition of another UE (500) is the same as the counterpart of the first node 550.

In a sidelink transmission from the first node 550 to another node 500, a higher-layer packet, including a first signal of the present disclosure, is provided to the controller/processor 590. The controller/processor 590 implements the functionality of the L2 layer. In the sidelink transmission, the controller/processor 590 provides header compression, encryption, packet segmentation and reordering, and multiplexing between a logical channel and a transport channel. The controller/processor 590 is also responsible for HARQ operation (if supportable), repeated transmitting and a signaling to the UE 500. The transmitting processor 555 provides various signal processing functions for the L1 (that is, PHY), including coding, interleaving, scrambling, modulation and power control/allocation, precoding and generation of physical layer control signaling. The generation of a first radio signal in the present disclosure is completed in the transmitting processor 555, and modulation symbols are divided into parallel streams, of which each stream is mapped onto a corresponding multicarrier subcarrier and/or multicarrier symbol, and then mapped by the transmitting processor 555 to the antenna 560 via the transmitter 556 to be transmitted in the form of radio frequency signal. At the receiving end, each receiver 516 receives a radio frequency signal via a corresponding antenna 520, and recovers baseband information modulated onto a radio frequency carrier and then provides the baseband information to the receiving processor 512. The receiving processor 512 provides various signal receiving functions of the L1, including the receiving of physical layer signal of the first radio signal in the present disclosure. Multicarrier symbols in multicarrier symbol streams are demodulated based on all kinds of modulation schemes (e.g., BPSK, QPSK), and are then de-scrambled, decoded and de-interleaved so as to recover data or control signals transmitted by the first communication node 550 on a physical channel. The data and the control signals are later provided to the controller/processor 540. The controller/processor 540 is in charge of the L2 layer and provides interpretation of the first radio signal in the present disclosure. The controller/processor can be associated with the memory 530 that stores program codes and data. the data source/memory 530 can be called a computer readable medium.

In one embodiment, the transmitter 556 (comprising the antenna 560), the transmitting processor 555 and the controller/processor 590 are used for transmitting the first radio signal in the present disclosure.

In one embodiment, the receiver 556 (comprising the antenna 560), the receiving processor 552 and the controller/processor 590 are used for sensing he target signaling in the present disclosure.

In one embodiment, the receiver 516 (comprising the antenna 520), the receiving processor 512 and the controller/processor 540 are used for receiving the first radio signal in the present disclosure.

Embodiment 6

Figure 6:
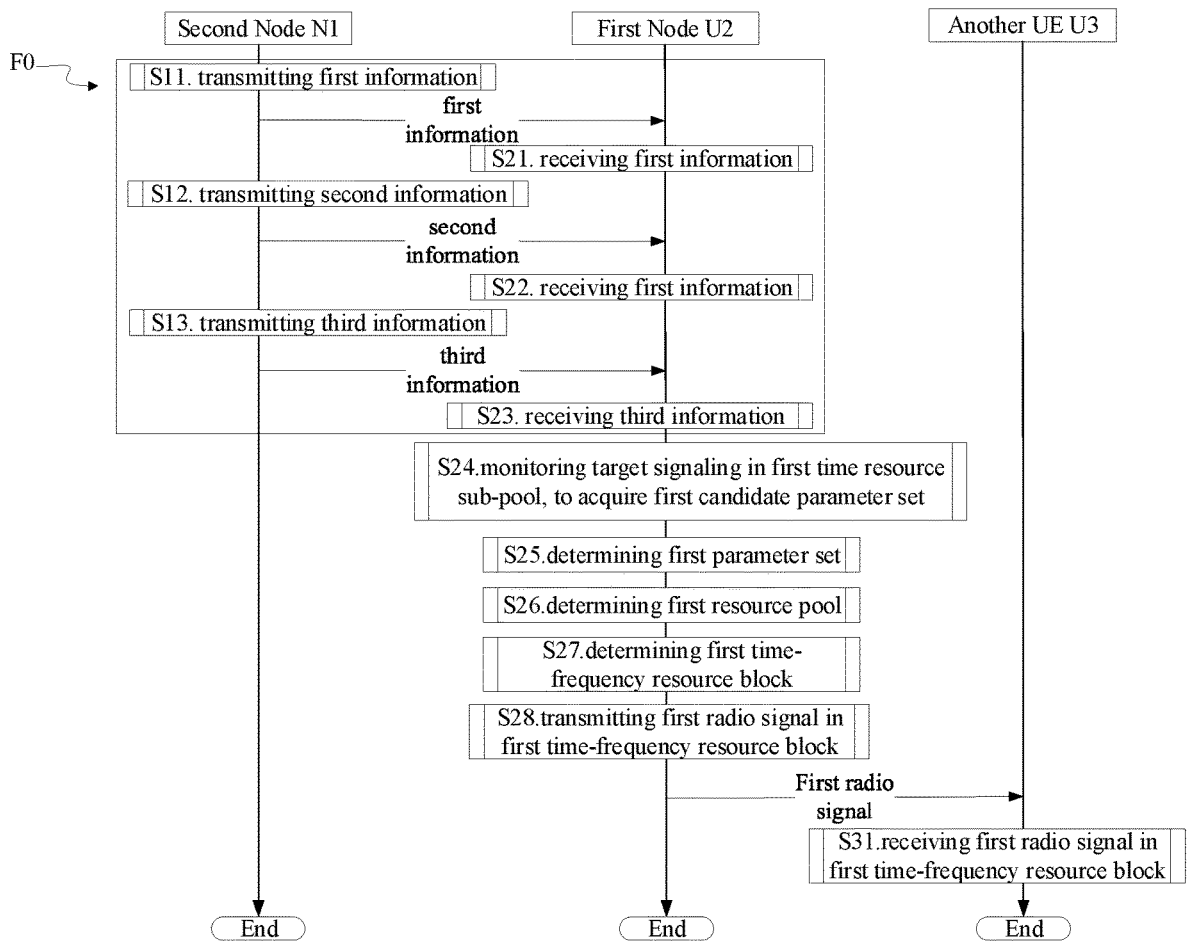
FIG. 6 illustrates a flowchart of radio signal transmission according to one embodiment of the present disclosure.

Embodiment 6 illustrates a flowchart of radio signal transmission according to one embodiment of the present disclosure, as shown in FIG. 6. In FIG. 6, a second node N1 is a maintenance base station for a serving cell of a first node U2, and the first node U2 is in sidelink communication with a UE U3. It should be noted that the sequential order illustrated herein does not restrict orders of signal transmissions and implementations of the present disclosure. In FIG. 6, steps marked by the box FO are optional.

The second node N1 transmits first information in step S11, transmits second information in step S12, and transmits third information in step S13.

The first node U2 receives first information in step S21, receives second information in step S22, and receives third information in step S23, senses a target signaling in a first time resource sub-pool in step S24 to acquire a first candidate parameter set, and determines a first parameter set in step S25, determines a first resource pool in step S26, determines a first time-frequency resource block in step S27, and transmits a first radio signal in the first time-frequency resource block in step S28.

The UE U3 receives a first radio signal in step S31.

In Embodiment 6, first information is received, the first information being used for determining an active time in a first time resource pool; a target signaling is sensed in a first time resource sub-pool; and a first radio signal is transmitted in a first time-frequency resource block, the first time-frequency resource block belonging to a first resource pool, the first resource pool being either one of a first candidate resource pool and a second candidate resource pool; herein, the first time resource sub-pool belongs to the active time in the first time resource pool; length of the first time resource sub-pool is used for determining the first resource pool between the first candidate resource pool and the second candidate resource pool; a first timer is maintained; herein, the active time in the first time resource pool comprises operation time of the first timer; and the active time in the first time resource pool comprises downlink reception time; herein, the first radio signal is transmitted on sidelink; measurement is performed in the first time resource sub-pool; herein, the first resource pool is the first candidate resource pool, and a first parameter set is used for determining the first time-frequency resource block from the first candidate resource pool, the first parameter set belonging to a first candidate parameter set, the first candidate parameter set being determined based on the measurement in the first time resource sub-pool; when the length of the first time resource sub-pool is greater than a first threshold, the first resource pool is determined from the first candidate resource pool; when the length of the first time resource sub-pool is smaller than a first threshold, the first resource pool is determined from the second candidate resource pool; a first bit block is used for generating the first radio signal, and whether the first radio signal is an initial transmission of the first bit block is used for determining the first resource pool between the first candidate resource pool and the second candidate resource pool; second information and third information are received; herein, the second information is used for determining the first candidate resource pool; the third information is used for determining the second candidate resource pool.

In one embodiment, the phrase of maintaining a first timer includes that the first node starts the first timer at a first instant of time in the first time resource pool.

In one embodiment, the first instant of time has a fixed position in the first time resource pool.

In one embodiment, a position of the first instant of time in the first time resource pool is configured by a downlink signaling.

In one embodiment, a position of the first instant of time in the first time resource pool is configured by the first information.

In one embodiment, the phrase that the first node starts the first timer at a first instant of time in the first time resource pool means setting the first timer as 0.

In one embodiment, the phrase of maintaining a first timer includes that when a value of the first timer is smaller than a first expired value, the first node increments the value of the first timer by 1 for every slot that passes.

In one embodiment, the phrase of maintaining a first timer includes that when a value of the first timer is smaller than a first expired value, the first node increments the value of the first timer by 1 for every slot likely to be used for transmitting DCI that passes.

In one embodiment, the phrase of maintaining a first timer includes that when a value of the first timer is smaller than a first expired value, the first node increments the value of the first timer by 1 for every slot likely to be used for transmitting SCI that passes.

In one embodiment, the phrase of maintaining a first timer includes that when a value of the first timer is equal to a first expired value, the first node stops the first timer.

In one embodiment, the first expired value is a positive integer.

In one embodiment, the first expired value is a fixed value.

In one embodiment, the first expired value is configured by a downlink signaling.

In one embodiment, the first expired value is configured by the first information.

In one embodiment, the phrase that the first node starts the first timer at a first instant of time in the first time resource pool means setting the first timer as a first positive integer.

In one embodiment, the first positive integer is configured by a downlink signaling.

In one embodiment, the first positive integer is configured by the first information.

In one embodiment, the first positive integer is a fixed value.

In one embodiment, the phrase of maintaining a first timer includes that when a value of the first timer is greater than 0, the first node decrements the value of the first timer by 1 for every slot that passes.

In one embodiment, the phrase of maintaining a first timer includes that when a value of the first timer is greater than 0, the first node decrements the value of the first timer by 1 for every slot likely to be used for transmitting DCI that passes.

In one embodiment, the phrase of maintaining a first timer includes that when a value of the first timer is greater than 0, the first node decrements the value of the first timer by 1 for every slot likely to be used for transmitting SCI that passes.

In one embodiment, the phrase of maintaining a first timer includes that when a value of the first timer is equal to 0, the first node stops the first timer.

In one embodiment, the first timer is a drx-onDuration-Timer.

In one embodiment, the first timer is a drx-onDuration-TimerSL.

In one embodiment, the first timer is maintained on a MAC layer.

In one embodiment, the first timer is maintained by a MAC entity.

In one embodiment, while the first timer is in operation, the first node is at the Active Time in the first time resource pool.

In one embodiment, while the first timer is in operation, the first node is at the Continuous RX state in the first time resource pool.

In one embodiment, while the first timer is in operation, the first node senses a physical layer signaling in each D2D resource pool comprised in the first time resource pool.

In one embodiment, while the first timer is in operation, the first node senses a physical layer signaling in each V2X resource pool comprised in the first time resource pool.

In one embodiment, while the first timer is in operation, the first node senses DCI in each downlink slot comprised in the first time resource pool.

In one embodiment, the downlink reception time comprises time of suspense of a scheduling request sent by the first transmitter.

In one embodiment, the downlink reception time comprises a time gap between a time at which the first receiver successfully receives non-contention-based random access response information and a time at which an earliest new data transmission scheduling control signaling is received, wherein the time at which the non-contention-based random access response information is successfully received is earlier than the time at which the new data transmission scheduling control signaling is received.

In one embodiment, the time of suspense of the scheduling request comprises a time gap between a time at which a last symbol of the scheduling request is transmitted and a time at which a scheduling control signaling for the scheduling request is received.

In one embodiment, the scheduling request is an uplink scheduling request.

In one embodiment, the scheduling request is a sidelink scheduling request.

In one embodiment, the new data transmission scheduling control signaling is an uplink data transmission control signaling.

In one embodiment, the new data transmission scheduling control signaling is a PDCCH.

In one embodiment, the new data transmission scheduling control signaling comprises all or part of fields in a DCI signaling.

In one embodiment, a format of the new data transmission scheduling control signaling is DCI format 0_0.

In one embodiment, a format of the new data transmission scheduling control signaling is DCI format 0_1.

In one embodiment, the new data transmission scheduling control signaling is a downlink data transmission scheduling signaling.

In one embodiment, a format of the new data transmission scheduling control signaling is DCI format 1_0.

In one embodiment, a format of the new data transmission scheduling control signaling is DCI format 1_1.

In one embodiment, the new data transmission scheduling control signaling is a sidelink data transmission scheduling signaling.

In one embodiment, the new data transmission scheduling control signaling is an NR model sidelink data transmission control signaling.

In one embodiment, the new data transmission scheduling control signaling comprises all or part of fields in an SCI signaling.

In one embodiment, a format of the new data transmission scheduling control signaling is DCI format 3_1.

In one embodiment, the phrase that the first candidate parameter set is determined based on the measurement in the first time resource sub-pool includes that the first candidate parameter set is determined through sensing the target signaling in the first time resource sub-pool.

In one embodiment, the first candidate parameter set is unrelated to any measurement outside the first time resource sub-pool.

In one embodiment, the first candidate parameter set comprises at least one of a CBR, a PSSCH-RSRP, an S-RSSI, an S-RSRQ or a priority.

In one embodiment, the first candidate parameter set comprises a CBR.

In one embodiment, the first candidate parameter set comprises a PSSCH-RSRP.

In one embodiment, the first candidate parameter set comprises an S-RSSI.

In one embodiment, the first candidate parameter set comprises an S-RSRQ.

In one embodiment, the first candidate parameter set comprises a Priority.

In one embodiment, the first candidate parameter set comprises a CBR and a Priority.

In one embodiment, the first candidate parameter set comprises a PSSCH-RSRP and a Priority.

In one embodiment, the first candidate parameter set comprises an S-RSSI and a Priority.

In one embodiment, the first candidate parameter set comprises an S-RSRQ and a Priority.

In one embodiment, the first candidate parameter set comprises a CBR, a PSSCH-RSRP and a priority.

In one embodiment, the phrase that the first parameter set belongs to a first candidate parameter set includes selecting a parameter set of a minimum CBR measured from a first candidate parameter set as the first parameter set.

In one embodiment, the phrase that the first parameter set belongs to a first candidate parameter set includes selecting a parameter set of a minimum PSSCH-RSR measured from a first candidate parameter set as the first parameter set.

In one embodiment, the phrase that the first parameter set belongs to a first candidate parameter set includes selecting a parameter set of a minimum S-RSSI measured from a first candidate parameter set as the first parameter set.

In one embodiment, the phrase that the first parameter set belongs to a first candidate parameter set includes selecting a parameter set of a minimum S-RSRQ measured from a first candidate parameter set as the first parameter set.

In one embodiment, the phrase that the first candidate parameter set is determined based on the measurement in the first time resource sub-pool includes performing blind decoding on the target signaling in the first time resource sub-pool, when successfully decoded, the target signaling gains priority carried by SCI, the priority indicating priority information of the target radio signal.

In one embodiment, the phrase that the first parameter set belongs to a first candidate parameter set includes that the priority of selecting the target radio signal from a first candidate parameter set is lower than priority of the first radio signal, and that a parameter set of a minimum PSSCH-RSRP measured is the first parameter set.

In one embodiment, the phrase that the first parameter set belongs to a first candidate parameter set includes that the priority of selecting the target radio signal from a first candidate parameter set is lower than priority of the first radio signal, and that a parameter set of a minimum S-RSSI measured is the first parameter set.

In one embodiment, the phrase that the first parameter set belongs to a first candidate parameter set includes that the priority of selecting the target radio signal from a first candidate parameter set is lower than priority of the first radio signal, and that a parameter set of a minimum S-RSRQ measured is the first parameter set.

In one embodiment, the first candidate parameter set is used for determining an available time-frequency resource block set.

In one embodiment, the first parameter set is used for selecting the first time-frequency resource block from the available time-frequency resource block set.

In one embodiment, a higher layer selects the first time-frequency resource block from the available time-frequency resource block set.

In one embodiment, the phrase that a first parameter set is used for determining the first time-frequency resource block from the first candidate resource pool includes that frequency-domain resources of the first time-frequency resource block comprise a frequency-domain resource block occupied by the target radio signal corresponding to the first parameter set.

In one embodiment, the phrase that a first parameter set is used for determining the first time-frequency resource block from the first candidate resource pool includes that frequency-domain resources of the first time-frequency resource block comprise the target radio signaling and a frequency-domain resource block occupied by the target radio signal corresponding to the first parameter set.

In one embodiment, the phrase that a first parameter set is used for determining the first time-frequency resource block from the first candidate resource pool includes that time-domain resources of the first time-frequency resource block comprise slots subsequent to periodic time-domain resources of the target radio signal corresponding to the first parameter set.

In one embodiment, the phrase that a first parameter set is used for determining the first time-frequency resource block from the first candidate resource pool includes that time-domain resources of the first time-frequency resource block comprise the target radio signaling and slots subsequent to periodic time-domain resources of the target radio signal corresponding to the first parameter set.

In one subembodiment of the above two embodiments, the phrase of slots subsequent to periodic time-domain resources of the target radio signal are behind the first time resource sub-pool.

In one subembodiment of the above two embodiments, the phrase of the target radio signaling and slots subsequent to periodic time-domain resources of the target radio signal are behind the first time resource sub-pool.

In one embodiment, when length of the first time resource sub-pool is greater than a first threshold, the first candidate resource pool is determined as the first resource pool; a method in LTE Standard TS36.213 is employed to select the first time-frequency resource block, namely, to select an available time-frequency resource block set according to measured channel quality and the priority carried in SCI and then to select the first time-frequency resource block from the available time-frequency resource block set by a higher layer.

In one embodiment, how to determine the first resource pool according to the sensing action in the first time resource pool is related to implementation (i.e., it is self-determined by terminal manufacturers, hence no need for standardization).

In one embodiment, when length of the first time resource sub-pool is greater than a first threshold, the first candidate resource pool is determined as the first resource pool; the first parameter set is determined out of the first candidate parameter set and the first time-frequency resource block is determined according to the first parameter set.

In one embodiment, when length of the first time resource sub-pool is smaller than a first threshold, the second candidate resource pool is determined as the first resource pool; a time-frequency resource block is selected at random from the second candidate resource pool as the first time-frequency resource block.

In one embodiment, when length of the first time resource sub-pool is smaller than a first threshold, the second candidate resource pool is determined as the first resource pool; a first available time-frequency resource block is selected from the second candidate resource pool as the first time-frequency resource block.

In one embodiment, when length of the first time resource sub-pool is smaller than a first threshold, the second candidate resource pool is determined as the first resource pool; how to select the first time-frequency resource block from the second candidate resource pool is implementation-related.

In one embodiment, the first threshold is fixed.

In one embodiment, the first threshold is configurable.

In one embodiment, the first threshold is measured by ms.

In one embodiment, the first threshold is equal to time length of a positive integer number of OFDM symbol(s), each of the OFDM symbol(s) corresponding to a subcarrier spacing of subcarriers occupied by the first radio signal in frequency domain.

In one embodiment, the first threshold is equal to time length of a positive integer number of slot(s), each of the slot(s) corresponding to a subcarrier spacing of subcarriers occupied by the first radio signal in frequency domain.

In one embodiment, the first threshold is equal to time length of a positive integer number of slot(s), each of the slot(s) corresponding to a subcarrier spacing of subcarriers occupied by the first time-frequency resource block in frequency domain.

In one embodiment, the first threshold is equal to a positive integral multiple of Tc, with Tc=1/(480000*4096) s.

In one embodiment, the first threshold is represented by a number of OFDM symbols.

In one embodiment, the first threshold is represented by a number of slots.

In one embodiment, the first threshold can be configured by a second node.

In one embodiment, the first threshold can be configured by a higher layer signaling.

In one embodiment, the first threshold can be carried in all or part of Information Elements (IEs) in an RRC signaling.

In one embodiment, the first threshold can be carried in all or part of fields of an IE in an RRC signaling.

In one embodiment, the first threshold can be carried in all or part of fields in a MAC layer signaling.

In one embodiment, the first threshold can be carried in DCI.

In one embodiment, the first threshold can be carried in SCI.

In one embodiment, the first threshold can be carried in the first information.

In one embodiment, the first bit block comprises a Media Access Control Serviced Data Unit (MAC SDU) and a corresponding MAC head.

In one embodiment, the corresponding MAC head is a MAC PDU head of a MAC Protocol Data Unit (PDU) in a first bit block.

In one embodiment, all or part of the first bit block is used for generating the first radio signal.

In one embodiment, all or part of the first bit block is used together with a reference signal for generating the first radio signal.

In one embodiment, the first radio signal is obtained by all or part of bits in the first bit block sequentially through CRC Calculation, Channel Coding, Rate matching, Scrambling, Modulation, Layer Mapping, Antenna Port Mapping, Mapping to Virtual Resource Blocks, Mapping from Virtual to Physical Resource Blocks, OFDM Baseband Signal Generation, and Modulation and Up conversion.

In one embodiment, the first bit block is transmitted on a Sidelink Share Channel (SL-SCH), and the corresponding MAC head is an SL-SCH subheader of the MAC PDU in a first bit block.

In one embodiment, the phrase of an initial transmission of the first bit block includes a first transmission of the first bit block.

In one embodiment, the phrase of an initial transmission of the first bit block includes a new transmission of the first bit block.

In one embodiment, the phrase of an initial transmission of the first bit block includes a transmission of the first bit block in a first transmission occasion of K transmission occasions when K repetitions are configured.

In one embodiment, the phrase of an initial transmission of the first bit block includes that a first signaling indicates time-frequency resources occupied by the first radio signal and an MCS employed by the first radio signal; a New Data Indicator (NDI) field in the first signaling indicates an initial transmission of the first bit block.

In one embodiment, the phrase of an initial transmission of the first bit block includes a transmission other than a retransmission of the first bit block.

In one embodiment, the phrase of an initial transmission of the first bit block includes a transmission other than a repetition of the first bit block.

In one embodiment, when the first radio signal is an initial transmission of the first bit block, length of the first time resource sub-pool is used for determining the first resource pool between the first candidate resource pool and the second candidate resource pool.

In one embodiment, when the first radio signal is a transmission other than an initial transmission of the first bit block, the length of the first time resource sub-pool is not used for determining the first resource pool between the first candidate resource pool and the second candidate resource pool.

In one embodiment, when the first radio signal is a transmission other than an initial transmission of the first bit block, the first node determines that a resource pool for transmitting the first radio signal is the same as a resource pool for an initial transmission of the first bit block.

In one embodiment, the second information is pre-configured.

In one embodiment, the second information is transmitted from a higher layer to a physical layer.

In one embodiment, the second information comprises all or part of IEs in an RRC signaling.

In one embodiment, the second information comprises all or part of fields of an IE in an RRC signaling.

In one embodiment, the second information is cell-specific information.

In one embodiment, the second information is information specific to a group of UEs.

In one embodiment, the second information is UE-specific information.

In one embodiment, the second information is transmitted via Broadcast.

In one embodiment, the second information is transmitted via Multicast.

In one embodiment, the second information is transmitted via Unicast.

In one embodiment, the second information comprises all or part of IEs in a System Information Block (SIB).

In one embodiment, the second information comprises all or part of fields of an IE in a SIB.

In one embodiment, the third information is pre-configured.

In one embodiment, the third information is transmitted from a higher layer to a physical layer.

In one embodiment, the third information comprises all or part of IEs in an RRC signaling.

In one embodiment, the third information comprises all or part of fields of an IE in an RRC signaling.

In one embodiment, the third information is cell-specific information.

In one embodiment, the third information is information specific to a group of UEs.

In one embodiment, the third information is UE-specific information.

In one embodiment, the third information is transmitted via Broadcast.

In one embodiment, the third information is transmitted via Multicast.

In one embodiment, the third information is transmitted via Unicast.

In one embodiment, the third information comprises all or part of IEs in a System Information Block (SIB).

In one embodiment, the third information comprises all or part of fields of an IE in a SIB.

Embodiment 7

Figure 7:
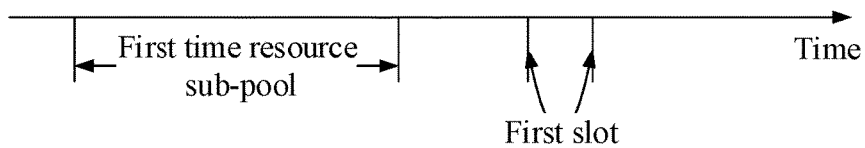
FIG. 7 illustrates a schematic diagram of a first time resource sub-pool according to one embodiment of the present disclosure.

Embodiment 7 illustrates a schematic diagram of a first time resource sub-pool according to one embodiment of the present disclosure, as shown in FIG. 7. In FIG. 7, a first time resource sub-pool is continuous in time domain.

In one embodiment, the first time resource sub-pool comprises a positive integer number of slot(s).

In one embodiment, a slot comprises 14 multicarrier symbols.

In one embodiment, a slot comprises 12 multicarrier symbols.

In one embodiment, a slot comprises a search space of a piece of SCI.

In one embodiment, a first time-frequency resource block belongs to a first slot in time domain; the first slot is behind the first time resource sub-pool.

Embodiment 8

Figure 8:
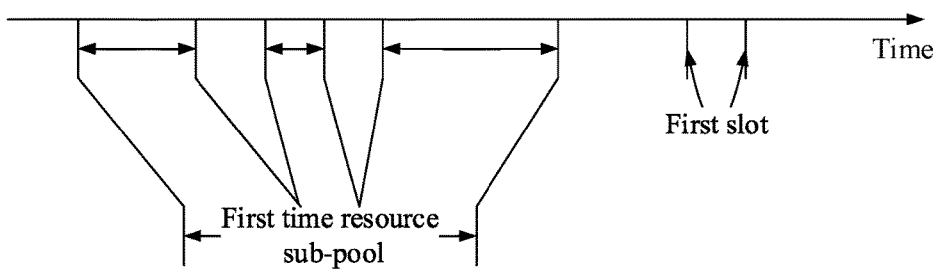
FIG. 8 illustrates another schematic diagram of a first time resource sub-pool according to one embodiment of the present disclosure.

Embodiment 8 illustrates another schematic diagram of a first time resource sub-pool according to one embodiment of the present disclosure, as shown in FIG. 8. In FIG. 8, a first time resource sub-pool is discontinuous in time domain.

In one embodiment, the first time resource sub-pool comprises a positive integer number of slot(s).

In one embodiment, slot(s) in the first time resource sub-pool is(are) reserved for V2X.

In one embodiment, slot(s) in the first time resource sub-pool is(are) reserved for a V2X Resource Pool.

In one embodiment, a first time-frequency resource block belongs to a first slot in time domain; the first slot is behind the first time resource sub-pool.

In one embodiment, the first slot is reserved for V2X.

In one embodiment, the first time resource sub-pool and the first slot are reserved for a same V2X resource pool.

Embodiment 9

Figure 9:
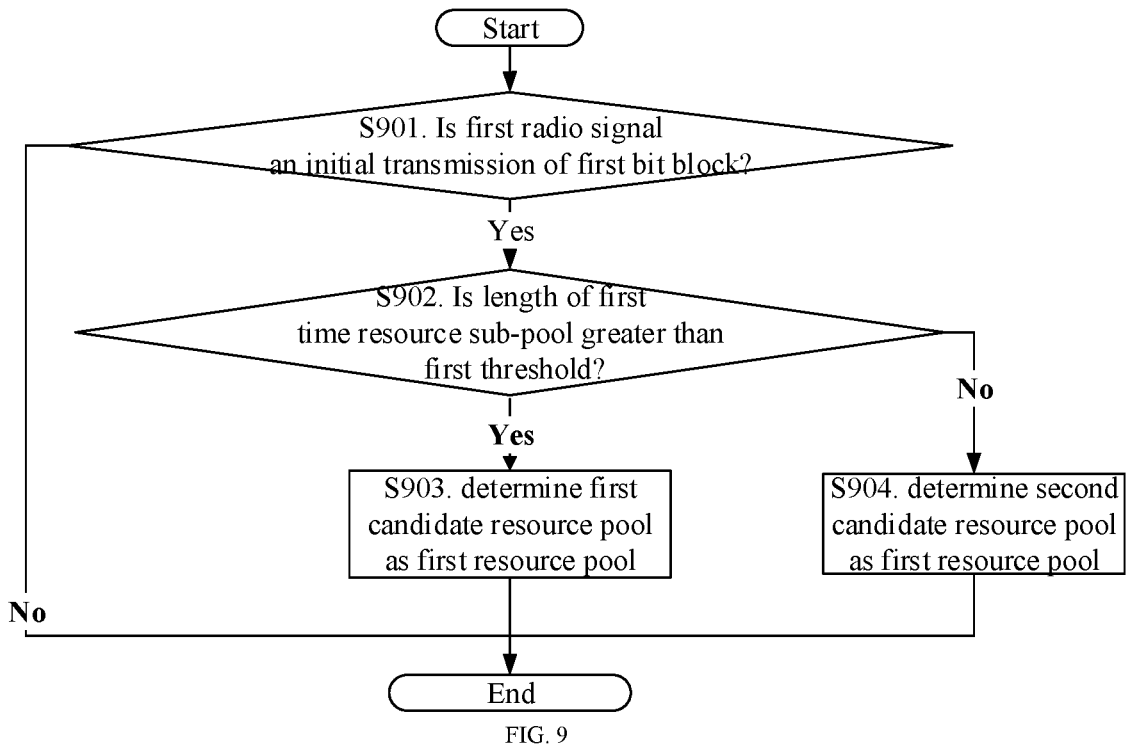
FIG. 9 illustrates a flowchart of determining a first resource pool according to one embodiment of the present disclosure.

Embodiment 9 illustrates a flowchart of determining a first resource pool according to one embodiment of the present disclosure, as shown in FIG. 9. Steps illustrated in FIG. 9 are executed by a first node.

In step S901, determine whether a first radio signal is an initial transmission of a first bit block, if not, come to an end; or, if so, proceed to step S902 to determine whether length of a first time resource sub-pool is greater than a first threshold, if so, implement step S903, or, if not, implement step S904; in step S903, determine a first candidate resource pool as a first resource pool; in step S904, determine a second candidate resource pool as a first resource pool.

In one embodiment, when the first radio signal is an initial transmission of the first bit block, and the length of the first time resource sub-pool is greater than the first threshold, the first candidate resource pool is determined as the first resource pool.

In one embodiment, when the first radio signal is an initial transmission of the first bit block, and the length of the first time resource sub-pool is smaller than the first threshold, the second candidate resource pool is determined as the first resource pool.

In one embodiment, when the first radio signal is an initial transmission of the first bit block, and the length of the first time resource sub-pool is equal to the first threshold, the first candidate resource pool is determined as the first resource pool.

In one embodiment, when the first radio signal is an initial transmission of the first bit block, and the length of the first time resource sub-pool is equal to the first threshold, the second candidate resource pool is determined as the first resource pool.

Embodiment 10

Figure 10:
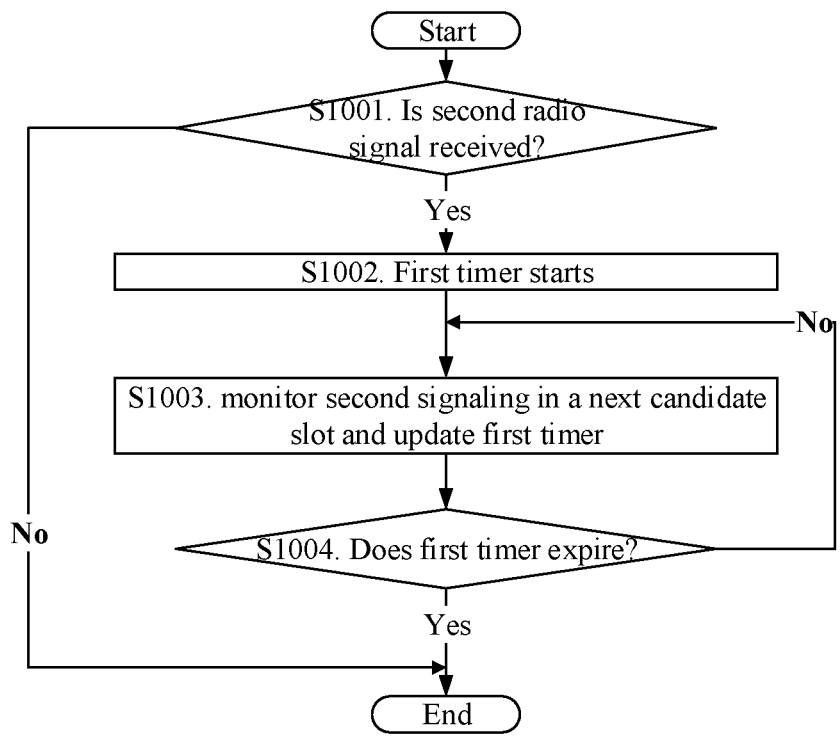
FIG. 10 illustrates a diagram of procedures of maintaining a first timer according to one embodiment of the present disclosure.

Embodiment 10 illustrates a diagram of procedures of maintaining a first timer according to one embodiment of the present disclosure, as shown in FIG. 10. Steps illustrated by FIG. 10 are executed by a first node.

In step S1001, determine whether a second radio signal is received, if so, start a first timer in step S1002, if not, come to an end; in step S1003, sense a target signaling in a next candidate slot and update a first timer; and determine in step S1004 whether the first timer expires, if so, come to an end, if not, go back to step S1003.

In one embodiment, the second radio signal is transmitted via an air interface.

In one embodiment, the second radio signal is transmitted via a wireless interface.

In one embodiment, the second radio signal is transmitted via a PC5 interface.

In one embodiment, the second radio signal is transmitted through SL.

In one embodiment, a target receiver of the second radio signal is a UE.

In one embodiment, a target receiver of the second radio signal is a Roadside Unit (RSU).

In one embodiment, a target receiver of the second radio signal is an On-board Unit.

In one embodiment, a target receiver of the second radio signal is a hand-held terminal.

In one embodiment, a target receiver of the second radio signal is a Laptop.

In one embodiment, the second radio signal is transmitted to the first node.

In one embodiment, the phrase of starting a first timer is to set the first timer as 0, and the phrase of updating a first timer is to increment the first timer by 1; if the first timer is equal to a second expired value, the first timer is expired, otherwise the first timer is not yet expired.

In one embodiment, the phrase of starting a first timer is to set the first timer as a second positive integer, and the phrase of updating a first timer is to decrement the first timer by 1; if the first timer is equal to 0, the first timer is expired, otherwise the first timer is not yet expired.

In one embodiment, the second expired value is a positive integer.

In one embodiment, the second expired value is a fixed value.

In one embodiment, the second expired value is configured by a downlink signaling.

In one embodiment, the second expired value is configured by the first information.

In one embodiment, the second positive integer is fixed.

In one embodiment, the second positive integer is configured by a downlink signaling.

In one embodiment, the second positive integer is configured by the first information.

In one embodiment, the downlink signaling is a higher layer signaling.

In one embodiment, the downlink signaling is broadcast.

In one embodiment, the next candidate slot is a nearest upcoming slot.

In one embodiment, the next candidate slot is a nearest upcoming slot reserved for V2X.

In one embodiment, the next candidate slot is a nearest upcoming slot reserved for a same V2X resource pool.

In one embodiment, the first timer is a drx-Inactivity-Timer.

In one embodiment, the first timer is a drx-InactivityTimerSL.

In one embodiment, counting of a first timer is maintained (i.e., the first timer is in operation) in the step S1001 (that is, at a time when the second radio signal is not received by the first node); a first timer is restarted in the step S1002 (that is, at a time when the second radio signal is received by the first node).

In one embodiment, a halted state of a first timer is maintained (i.e., the first timer is in operation) in the step S1001 (that is, at a time when the second radio signal is not received by the first node); a first timer is started in the step S1002 (that is, at a time when the second radio signal is received by the first node).

In one embodiment, start a second timer in a first OFDM symbol that follows as soon as the first timer expires.

In one embodiment, start a second timer in a first OFDM symbol reserved for V2X that follows as soon as the first timer expires.

In one embodiment, start a second timer in a first OFDM symbol reserved for SL transmission that follows as soon as the first timer expires.

In one embodiment, the second timer is a drx-ShortCycleTimer.

In one embodiment, the second timer is a drx-ShortCycleTimerSL.

In one embodiment, when the first timer is in operation, the first node is in a state of Continuous Reception; when the second timer is in operation, the first node is in a state of Discontinuous Reception (DRX).

In one embodiment, when the first node is in operation, the first node is in a DRX Short Cycle; when the second timer is in operation, the first node is in a DRX Long Cycle.

In one embodiment, the first information comprises an initial value of the second timer.

Embodiment 11

Figure 11:
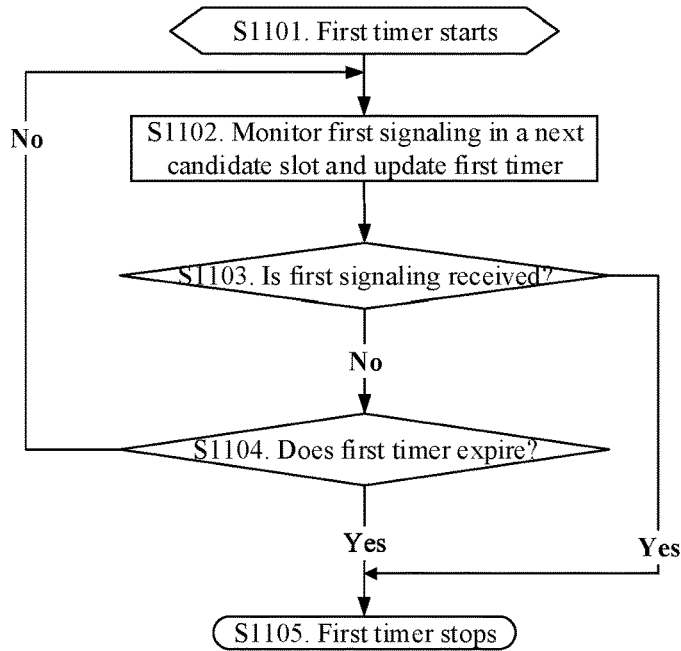
FIG. 11 illustrates another diagram of procedures of maintaining a first timer according to one embodiment of the present disclosure.

Embodiment 11 illustrates another diagram of procedures of maintaining a first timer according to one embodiment of the present disclosure, as shown in FIG. 11. Steps illustrated by FIG. 11 are executed by a first node.

Start a first timer in step S1101; and sense a first signaling in a next candidate slot and then update the first timer in step S1102; in step S1103, determine whether the first signaling is received, if not, proceed to execute step S1104, if so, skip to step S1105; in step S1104, determine whether the first timer expires, if so, execute step S1105, otherwise, go back to step S1102.

In one embodiment, in a first OFDM symbol after transmitting a specific signal, the first node starts the first timer.

In one embodiment, the specific signal is a HARQ feedback signaling, and the HARQ feedback signaling is feedback on whether a third radio signal received is correctly decoded.

In one embodiment, the specific signal is a fourth radio signal.

In one embodiment, in a first OFDM symbol after transmitting the specific signal, the first node starts a Round Trip Time (RTT) timer.

In one embodiment, in a first OFDM symbol after expiration of the RTT timer of the first node, the first node starts the first timer.

In one embodiment, in a first OFDM symbol after expiration of the sidelink (SL) RTT timer of the first node, the first node starts the first timer.

In one embodiment, when the third radio signal is not successfully decoded, and in a first OFDM symbol after expiration of the RTT timer of the first node, the first node starts the first timer.

In one embodiment, when the third radio signal is not successfully decoded, and in a first OFDM symbol after expiration of the SL RTT timer of the first node, the first node starts the first timer.

In one embodiment, the first signaling is a scheduling signaling that schedules a retransmission of the third radio signal; the first signaling indicates time-frequency resources occupied by the third radio signal and an MCS employed by the third radio signal.

In one embodiment, the first signaling is a scheduling signaling that schedules a retransmission of the fourth radio signal; the first signaling indicates time-frequency resources occupied by the fourth radio signal and an MCS employed by the fourth radio signal.

In one embodiment, the first signaling is a downlink scheduling signaling.

In one embodiment, the first signaling is a sidelink scheduling signaling.

In one embodiment, the first signaling is conveyed from a higher layer to a physical layer.

In one embodiment, the third radio signal and the fourth radio signal are respectively transmitted via unicast.

In one embodiment, the third radio signal and the fourth radio signal are respectively transmitted via groupcast.

In one embodiment, for transmission of the third radio signal, a HARQ functionality is enabled.

In one embodiment, the third radio signal and the fourth radio signal are respectively transmitted via an air interface.

In one embodiment, the third radio signal and the fourth radio signal are respectively transmitted via a wireless interface.

In one embodiment, the third radio signal and the fourth radio signal are respectively transmitted via a PC5 interface.

In one embodiment, the third radio signal and the fourth radio signal are respectively transmitted through SL.

In one embodiment, all or part of a TB is used for generating the third radio signal.

In one embodiment, all or part of a TB is used together with a reference signal for generating the third radio signal.

In one embodiment, all or part of a TB is used for generating the fourth radio signal.

In one embodiment, all or part of a TB is used together with a reference signal for generating the fourth radio signal.

In one embodiment, target receivers respectively for the third radio signal and the fourth radio signal are UEs.

In one embodiment, target receivers respectively for the third radio signal and the fourth radio signal are RSUs.

In one embodiment, target receivers respectively for the third radio signal and the fourth radio signal are on-board units.

In one embodiment, target receivers respectively for the third radio signal and the fourth radio signal are hand-held terminals.

In one embodiment, target receivers respectively for the third radio signal and the fourth radio signal are Laptops.

In one embodiment, a target receiver of the third radio signal is the first node in the present disclosure.

In one embodiment, a target receiver of the fourth radio signal is a node other than the first node in the present disclosure.

In one embodiment, the phrase of starting a first timer means setting the first timer as 0, and the phrase of updating a first timer means incrementing the first timer by 1; if a first timer is equal to a third expired value, the first timer is expired, otherwise the first timer is not yet expired.

In one embodiment, the phrase of starting a first timer means setting the first timer as a third positive integer, and the phrase of updating a first timer means decrementing the first timer by 1; if a first timer is equal to 0, the first timer is expired, otherwise the first timer is not yet expired.

In one embodiment, the third expired value is a positive integer.

In one embodiment, the third expired value is a fixed value.

In one embodiment, the third expired value is configured by a downlink signaling.

In one embodiment, the third expired value is configured by the first information.

In one embodiment, the third positive integer is fixed.

In one embodiment, the third positive integer is configured by a downlink signaling.

In one embodiment, the third positive integer is configured by the first information.

In one embodiment, the downlink signaling is a higher layer signaling.

In one embodiment, the downlink signaling is broadcast.

In one embodiment, the next candidate slot is a nearest upcoming slot.

In one embodiment, the next candidate slot is a nearest upcoming slot reserved for V2X.

In one embodiment, the next candidate slot is a nearest upcoming slot reserved for a same V2X resource pool.

In one embodiment, the first timer is a drx-RetransmissionTimer.

In one embodiment, the first timer is a drx-RetransmissionTimerSL.

Embodiment 12

Figure 12:
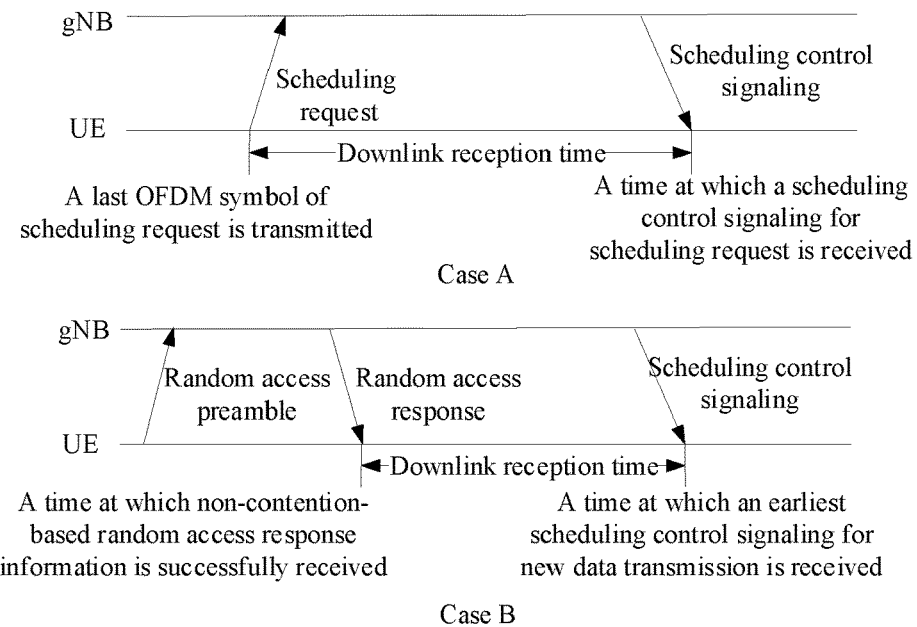
FIG. 12 illustrates a schematic diagram of downlink reception time in a first node according to one embodiment of the present disclosure.

Embodiment 12 illustrates a schematic diagram of downlink reception time in a first node according to one embodiment of the present disclosure, as shown in FIG. 12.

In Case A of the Embodiment 12, the first node transmits a scheduling request, and is in a state of downlink reception during a time gap between a time at which a last symbol of the scheduling request is transmitted and a time at which a scheduling control signaling for the scheduling request is received; the downlink reception time belongs to an active time in the first time resource pool.

In one embodiment, the scheduling request is an uplink scheduling request.

In one embodiment, the scheduling request is a sidelink scheduling request.

In Case B of the Embodiment 12, the first node transmits a non-contention-based random access preamble; and the first node receives non-contention-based random access response information. In a time gap between a time at which the non-contention-based random access response information is successfully received and a time at which an earliest new data transmission scheduling control signaling is received, the first node is in downlink reception; the downlink reception time belongs to an active time in the first time resource pool.

Embodiment 13

Figure 13:
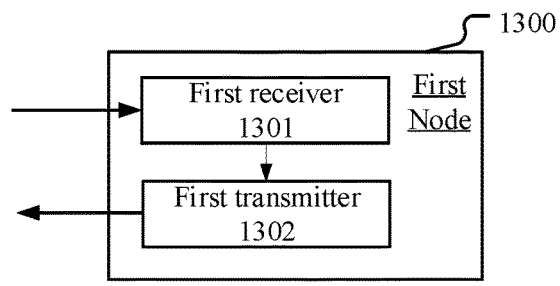
FIG. 13 illustrates a structure block diagram of a processing device in a first node according to one embodiment of the present disclosure.

Embodiment 13 illustrates a structure block diagram of a processing device in a first node according to one embodiment of the present disclosure, as shown in FIG. 13. In FIG. 13, a first node's processing device 1300 comprises a first receiver 1301 and a first transmitter 1302. The first receiver 1301 comprises the transmitter/receiver 456 (comprising the antenna 460), the receiving processor 452 and the controller/processor 490 in FIG. 4 of the present disclosure; or the first receiver 1301 comprises the transmitter/receiver 556 (comprising the antenna 560), the receiving processor 552 and the controller/processor 590 in FIG. 5 of the present disclosure. The first transmitter 1302 comprises the transmitter/receiver 456 (comprising the antenna 460), the transmitting processor 455 and the controller/processor 490 in FIG. 4 of the present disclosure; or the first transmitter 1302 comprises the transmitter/receiver 556 (comprising the antenna 560), the transmitting processor 555 and the controller/processor 590 in FIG. 5 of the present disclosure.

In Embodiment 13, the first receiver 1301 receives first information, the first information being used for determining an active time in a first time resource pool; the first receiver 1301 senses a target signaling in a first time resource sub-pool; and the first transmitter 1302 transmits a first radio signal in a first time-frequency resource block, the first time-frequency resource block belonging to a first resource pool, the first resource pool being either one of a first candidate resource pool and a second candidate resource pool; herein, the first time resource sub-pool belongs to the active time in the first time resource pool; and a length of the first time resource sub-pool is used for determining the first resource pool between the first candidate resource pool and the second candidate resource pool.

In one embodiment, maintain a first timer; herein, the active time in the first time resource pool comprises operation time of the first timer.

In one embodiment, the active time in the first time resource pool comprises downlink reception time; herein, the first radio signal is transmitted on sidelink.

In one embodiment, the first receiver 1301 performs measurement in the first time resource sub-pool; herein, the first resource pool is the first candidate resource pool, and a first parameter set is used for determining the first time-frequency resource block from the first candidate resource pool, the first parameter set belonging to a first candidate parameter set, the first candidate parameter set being determined based on the measurement in the first time resource sub-pool.

In one embodiment, when the length of the first time resource sub-pool is greater than a first threshold, the first resource pool is determined from the first candidate resource pool; when the length of the first time resource sub-pool is smaller than a first threshold, the first resource pool is determined from the second candidate resource pool.

In one embodiment, a first bit block is used for generating the first radio signal, and whether the first radio signal is an initial transmission of the first bit block is used for determining the first resource pool between the first candidate resource pool and the second candidate resource pool.

In one embodiment, the first receiver 1301 receives second information and third information; herein, the second information is used for determining the first candidate resource pool, while the third information is used for determining the second candidate resource pool.

Embodiment 14

Figure 14:
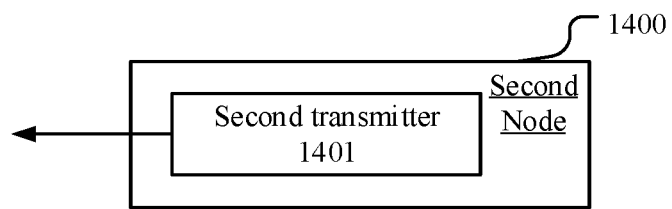
FIG. 14 illustrates a structure block diagram of a processing device in a second node according to one embodiment of the present disclosure.

Embodiment 14 illustrates a structure block diagram of a processing device in a second node according to one embodiment of the present disclosure, as shown in FIG. 14. In FIG. 14, a second node's processing device 1400 comprises a second transmitter 1401. The second transmitter

1401 comprises the transmitter/receiver 416 (comprising the antenna 460), the transmitting processor 415 and the controller/processor 440 in FIG. 4 of the present disclosure. The second transmitter 1404 is optional.

In Embodiment 14, the second transmitter 1401 transmits first information, the first information being used for indicating an active time in a first time resource pool; a target signaling is sensed in a first time resource sub-pool; a first time-frequency resource block is used for transmitting a first radio signal; the first time-frequency resource block belongs to a first resource pool, the first resource pool being either one of a first candidate resource pool and a second candidate resource pool; herein, the first time resource sub-pool belongs to the active time in the first time resource pool; length of the first time resource sub-pool is used for determining the first resource pool between the first candidate resource pool and the second candidate resource pool.

In one embodiment, a first timer is maintained; herein, the active time in the first time resource pool comprises operation time of the first timer.

In one embodiment, the active time in the first time resource pool comprises downlink reception time; herein, the first radio signal is transmitted on sidelink.

In one embodiment, the target signaling is measured in the first time resource sub-pool; herein, the first resource pool is the first candidate resource pool, and a first parameter set is used for determining the first time-frequency resource block from the first candidate resource pool, the first parameter set belonging to a first candidate parameter set, the first candidate parameter set being determined based on the measurement in the first time resource sub-pool.

In one embodiment, when the length of the first time resource sub-pool is greater than a first threshold, the first resource pool is determined from the first candidate resource pool; when the length of the first time resource sub-pool is smaller than a first threshold, the first resource pool is determined from the second candidate resource pool.

In one embodiment, a first bit block is used for generating the first radio signal, and whether the first radio signal is an initial transmission of the first bit block is used for determining the first resource pool between the first candidate resource pool and the second candidate resource pool.

In one embodiment, the second transmitter 1401 transmits second information and third information; herein, the second information is used for determining the first candidate resource pool, while the third information is used for determining the second candidate resource pool.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The first-type communication node or UE or terminal includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts, etc.

The second-type communication node, or base station or network-side equipment in the present disclosure includes but is not limited to macro-cellular base stations, micro-cellular base stations, home base stations, relay base station, eNB, gNB, Transmitter Receiver Point (TRP), relay satellite, satellite base station, airborne base station and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
a first receiver, which receives first information, the first information being used for determining an active time in a first time resource pool; and which senses a target signaling in a first time resource sub-pool; and
a first transmitter, which transmits a first radio signal in a first time-frequency resource block, the first time-frequency resource block belonging to a first resource pool, the first resource pool being either one of a first candidate resource pool and a second candidate resource pool; wherein:
the first time resource sub-pool belongs to the active time in the first time resource pool;
a length of the first time resource sub-pool is used for determining the first resource pool between the first candidate resource pool and the second candidate resource pool;
the sensing performed in the first time resource sub-pool is in the first candidate resource pool rather than in the second candidate resource pool; and
when the second candidate resource pool is determined as the first resource pool, the first time-frequency resource block is selected at random.

2. The first node according to claim 1, comprising:
maintaining a first timer;
wherein the active time in the first time resource pool comprises operation time of the first timer.

3. The first node according to claim 1, comprising:
the active time in the first time resource pool comprising downlink reception time;
wherein the first radio signal is transmitted on sidelink.

4. The first node according to claim 1, comprising:
the first receiver, which performs measurement in the first time resource sub-pool;
wherein the first resource pool is the first candidate resource pool, and a first parameter set is used for determining the first time-frequency resource block from the first candidate resource pool, the first parameter set belonging to a first candidate parameter set, the first candidate parameter set being determined based on the measurement in the first time resource sub-pool.

5. The first node according to claim 1, comprising:
when the length of the first time resource sub-pool is greater than a first threshold, determining the first resource pool from the first candidate resource pool;
when the length of the first time resource sub-pool is smaller than a first threshold, determining the first resource pool from the second candidate resource pool.

6. The first node according to claim 1, wherein:
a first bit block is used for generating the first radio signal, and
the first resource pool is determined between the first candidate resource pool and the second candidate resource pool based on whether an initial transmission of the first bit block is arranged in a transmission of the first radio signal.

7. The first node according to claim 6, wherein when the initial transmission of the first bit block is arranged in the transmission of the first radio signal:
when the length of the first time resource sub-pool is greater than the first threshold, the first candidate resource pool is determined as the first resource pool; and
when the length of the first time resource sub-pool is smaller than the first threshold, the second candidate resource pool is determined as the first resource pool.

8. The first node according to claim 6, wherein the initial transmission of the first bit block comprises when K repetitions are configured, the first node transmitting the first bit block in a first transmission occasion of K transmission occasions.

9. The first node according to claim 1, wherein:
the first receiver receives second information and third information; and
the second information is used for determining the first candidate resource pool, while the third information is used for determining the second candidate resource pool.

10. A second node for wireless communications, comprising:
a second transmitter, which transmits first information, the first information being used for indicating an active time in a first time resource pool; a target signaling being sensed in a first time resource sub-pool;
a first time-frequency resource block being used for transmitting a first radio signal, and the first time-frequency resource block belonging to a first resource pool, the first resource pool being either one of a first candidate resource pool and a second candidate resource pool; wherein:
the first time resource sub-pool belongs to the active time in the first time resource pool; and
a length of the first time resource sub-pool is used for determining the first resource pool between the first candidate resource pool and the second candidate resource pool;
the sensing performed in the first time resource sub-pool is in the first candidate resource pool rather than in the second candidate resource pool; and
when the second candidate resource pool is determined as the first resource pool, the first time-frequency resource block is selected at random.

11. The second node according to claim 10, comprising:
a first timer being maintained;
wherein the active time in the first time resource pool comprises operation time of the first timer.

12. The second node according to claim 10, comprising:
the active time in the first time resource pool comprising downlink reception time;
wherein the first radio signal is transmitted on sidelink.

13. The second node according to claim 10, comprising:
the target signaling being measured in the first time resource sub-pool;
wherein the first resource pool is the first candidate resource pool, and a first parameter set is used for determining the first time-frequency resource block from the first candidate resource pool, the first parameter set belonging to a first candidate parameter set, the first candidate parameter set being determined based on the measurement in the first time resource sub-pool.

14. The second node according to claim 10, comprising:
when the length of the first time resource sub-pool is greater than a first threshold, determining the first resource pool from the first candidate resource pool;
when the length of the first time resource sub-pool is smaller than a first threshold, determining the first resource pool from the second candidate resource pool.

15. The second node according to claim 10, wherein:
a first bit block is used for generating the first radio signal, and
the first resource pool is determined between the first candidate resource pool and the second candidate resource pool based on whether an initial transmission of the first bit block is arranged in a transmission of the first radio signal.

16. The second node according to claim 15, wherein:
when the initial transmission of the first bit block is arranged in the transmission of the first radio signal:
when the length of the first time resource sub-pool is greater than the first threshold, the first candidate resource pool is determined as the first resource pool; and
when the length of the first time resource sub-pool is smaller than the first threshold, the second candidate resource pool is determined as the first resource pool.

17. The second node according to claim 15, wherein the initial transmission of the first bit block comprises: when K repetitions are configured, transmitting the first bit block in a first transmission occasion of K transmission occasions.

18. The second node according to claim 10, wherein:
the second transmitter transmits second information and third information; and
the second information is used for indicating the first candidate resource pool, while the third information is used for indicating the second candidate resource pool.

19. A method in a first node for wireless communications, comprising:
receiving first information, the first information being used for determining an active time in a first time resource pool;
sensing a target signaling in a first time resource sub-pool; and
transmitting a first radio signal in a first time-frequency resource block, the first time-frequency resource block belonging to a first resource pool, the first resource pool being either one of a first candidate resource pool and a second candidate resource pool; wherein:
the first time resource sub-pool belongs to the active time in the first time resource pool;
a length of the first time resource sub-pool is used for determining the first resource pool between the first candidate resource pool and the second candidate resource pool;
the sensing performed in the first time resource sub-pool is in the first candidate resource pool rather than in the second candidate resource pool; and
when the second candidate resource pool is determined as the first resource pool, the first time-frequency resource block is selected at random.

20. The method in the first node according to claim 19, wherein:
a first bit block being used for generating the first radio signal, and
the first resource pool is determined between the first candidate resource pool and the second candidate resource pool based on whether an initial transmission of the first radio signal is arranged in a transmission of the first bit block.

\* \* \* \* \*